United States Patent
Hellring et al.

(10) Patent No.: US 12,191,496 B2
(45) Date of Patent: Jan. 7, 2025

(54) ELECTRODE BINDER SLURRY COMPOSITION FOR LITHIUM ION ELECTRICAL STORAGE DEVICES

(71) Applicant: PPG Industries Ohio, Inc., Cleveland, OH (US)

(72) Inventors: Stuart D. Hellring, Pittsburgh, PA (US); Scott W. Sisco, Glenshaw, PA (US); Jacob W. Mohin, Gibsonia, PA (US); Shanti Swarup, Allison Park, PA (US); Calum H. Munro, Gibsonia, PA (US); Olivia L Jones, Cranberry Township, PA (US); Ryan T. Plazio, Apollo, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 18/533,882

(22) Filed: Dec. 8, 2023

(65) Prior Publication Data

US 2024/0120491 A1   Apr. 11, 2024

Related U.S. Application Data

(63) Continuation of application No. 16/629,254, filed as application No. PCT/US2018/041131 on Jul. 6, 2018, now Pat. No. 11,843,118.

(60) Provisional application No. 62/529,499, filed on Jul. 7, 2017.

(51) Int. Cl.
| | |
|---|---|
| *H01M 4/62* | (2006.01) |
| *C08L 27/16* | (2006.01) |
| *H01G 11/50* | (2013.01) |
| *H01G 11/60* | (2013.01) |
| *H01M 4/66* | (2006.01) |
| *H01M 10/0525* | (2010.01) |
| *H01M 10/0569* | (2010.01) |

(52) U.S. Cl.
CPC ............ *H01M 4/623* (2013.01); *C08L 27/16* (2013.01); *H01G 11/50* (2013.01); *H01M 4/625* (2013.01); *H01M 4/661* (2013.01); *H01M 10/0525* (2013.01); *H01M 10/0569* (2013.01); *C08L 2201/56* (2013.01); *H01G 11/60* (2013.01); *H01M 2300/0028* (2013.01)

(58) Field of Classification Search
CPC ...... H01M 4/623; H01M 4/625; H01M 4/661; H01M 10/0525; H01M 10/0569; H01M 2300/0028; C08L 27/16; C08L 2201/56; H01G 11/50; H01G 11/60
See application file for complete search history.

(56) References Cited

U.S. PATENT DOCUMENTS

| | | |
|---|---|---|
| 6,168,885 B1 | 1/2001 | Narang et al. |
| 9,236,612 B2 | 1/2016 | Igarashi et al. |
| 9,257,696 B2 | 2/2016 | Koh et al. |
| 9,273,399 B2 | 3/2016 | Hellring et al. |
| 9,385,374 B2 | 7/2016 | Hellring et al. |
| 9,466,830 B1 | 10/2016 | Shan et al. |
| 9,761,903 B2 | 9/2017 | Hellring et al. |
| 10,033,043 B2 | 7/2018 | Hellring et al. |
| 10,128,541 B2 | 11/2018 | Itakura et al. |
| 10,619,070 B2 | 4/2020 | Kobayashi et al. |
| 10,763,490 B2 | 9/2020 | Daughenbaugh et al. |
| 10,964,949 B2 | 3/2021 | Hellring et al. |
| 11,228,037 B2 | 1/2022 | Huang et al. |
| 2010/0304270 A1 | 12/2010 | Amin-Sanayei et al. |
| 2011/0318638 A1 | 12/2011 | Koh et al. |
| 2015/0099171 A1 | 4/2015 | Alarco et al. |
| 2015/0200398 A1 | 7/2015 | Yeou et al. |
| 2015/0280238 A1* | 10/2015 | Hellring ............... H01M 4/5825 429/188 |
| 2016/0204465 A1 | 7/2016 | Mimura et al. |
| 2017/0110733 A1 | 4/2017 | Yoon et al. |
| 2018/0048027 A1 | 2/2018 | Itakura et al. |
| 2018/0114988 A1 | 4/2018 | Yoon et al. |
| 2018/0269484 A1 | 9/2018 | Kobayashi et al. |
| 2020/0227752 A1 | 7/2020 | Hellring et al. |
| 2020/0295373 A1 | 9/2020 | Hellring et al. |

FOREIGN PATENT DOCUMENTS

| | | |
|---|---|---|
| CN | 100456536 C | 1/2009 |
| CN | 1331252 C | 10/2009 |
| CN | 103715393 B | 4/2014 |
| CN | 104094447 A | 10/2014 |
| CN | 104497190 B | 4/2015 |
| CN | 105612641 A | 5/2016 |
| CN | 106299379 A | 1/2017 |
| CN | 106463732 B | 2/2017 |
| EP | 3168910 B1 | 5/2017 |
| JP | H10172573 A | 6/1998 |
| JP | H11329904 A | 11/1999 |

(Continued)

OTHER PUBLICATIONS

"New Polymer Synthesis and Preparation Technology", Chemistry and Chemical Engineering Excellent Series Books, Harbin Institute of Technology Press, Zhen Hu, Chunhua Zhang, Yan Liang.

(Continued)

*Primary Examiner* — Sarah A. Slifka
(74) *Attorney, Agent, or Firm* — Ashley N. Crane

(57) ABSTRACT

The present invention provides a slurry composition comprising (a) an electrochemically active material and/or an electrically conductive agent; and (b) a binder comprising (i) a polymer comprising a fluoropolymer dispersed in a liquid medium; and (ii) a polymer comprising an addition polymer comprising constitutional units comprising the residue of a heterocyclic group-containing ethylenically unsaturated monomer. The present invention also provides electrodes and electrical storage devices.

20 Claims, 1 Drawing Sheet

(56) References Cited

FOREIGN PATENT DOCUMENTS

| | | | |
|---|---|---|---|
| JP | 2000150320 A | 5/2000 |
| JP | 4325002 B2 | 6/2000 |
| JP | 2002260666 A | 9/2002 |
| JP | 2002367678 A | 12/2002 |
| JP | 2003257433 A | 9/2003 |
| JP | 2003317722 A | 11/2003 |
| JP | 2004071566 A | 3/2004 |
| JP | 2007273639 A | 10/2007 |
| JP | 2010049872 A | 3/2010 |
| JP | 2009063907 A | 3/2011 |
| JP | 2013084351 A | 5/2013 |
| JP | 2014132591 A | 7/2014 |
| JP | 2014181252 A | 9/2014 |
| JP | 2016181479 A | 10/2016 |
| JP | 2016201244 A | 12/2016 |
| JP | 2017010093 A | 4/2018 |
| KR | 20020092029 A | 12/2002 |
| KR | 20060037618 A | 5/2006 |
| KR | 20160046882 A | 4/2016 |
| KR | 20160082503 A | 7/2016 |
| KR | 20160139240 A | 12/2016 |
| KR | 2017050078 A | 5/2017 |
| TW | 200410439 A | 6/2004 |
| WO | 2000049103 A1 | 8/2000 |
| WO | 2008-129041 A1 | 10/2008 |
| WO | 2012124582 A1 | 9/2012 |
| WO | 2013183717 A1 | 12/2013 |
| WO | 2015064099 A1 | 5/2015 |
| WO | 2015153583 A1 | 10/2015 |
| WO | 2016190666 A1 | 12/2016 |
| WO | 2017010093 A1 | 1/2017 |
| WO | 2017056974 A1 | 4/2017 |

OTHER PUBLICATIONS

"Green Plasticizers", Scientific and Technical Documentation Press, Beijing China, Oct. 2011, Duoren Wang.

* cited by examiner

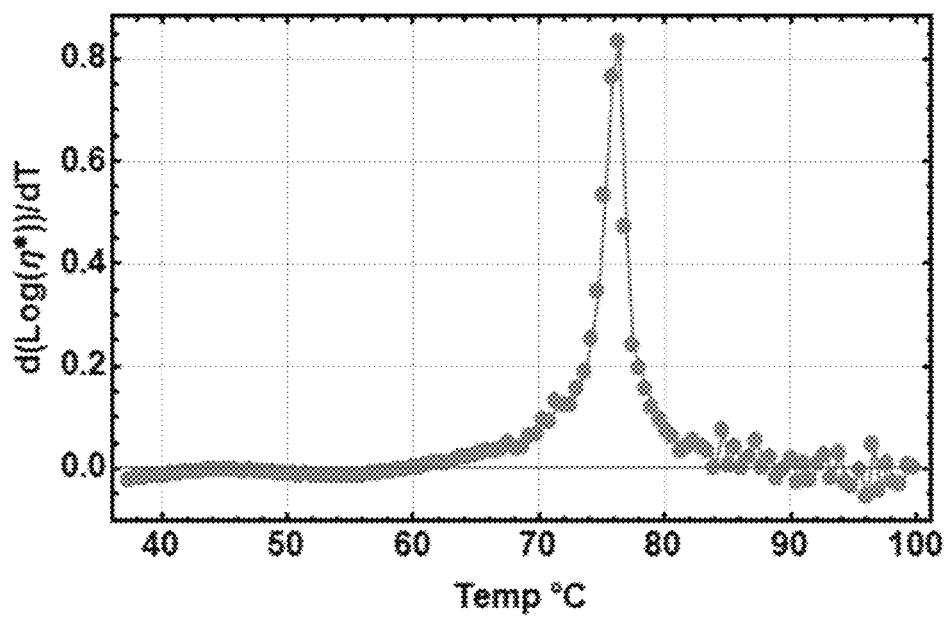

ELECTRODE BINDER SLURRY COMPOSITION FOR LITHIUM ION ELECTRICAL STORAGE DEVICES

CROSS-REFERENCE TO RELATED APPLICATIONS

This application is a continuation application of U.S. application Ser. No. 16/629,254, filed on Jan. 7, 2020, now allowed, which is a national stage entry of Int'l App. Ser. No. PCT/US2018/041131, filed on Jul. 6, 2018, which claims the benefit of U.S. Prov. App. Ser. No. 62/529,499, filed on Jul. 7, 2017, each of which are incorporated herein by reference.

FIELD OF THE INVENTION

The invention relates to fluoropolymer, such as polyvinylidene fluoride (PVDF), slurry compositions for manufacturing electrodes for use in electrical storage devices, such as batteries.

BACKGROUND OF THE INVENTION

There is a trend in the electronics industry to produce smaller devices, powered by smaller and lighter batteries. Batteries with a negative electrode—such as a carbonaceous material, and a positive electrode—such as lithium metal oxides can provide relatively high power and low weight.

Polyvinylidene fluoride, because of its excellent electrochemical resistance, has been found to be a useful binder for forming electrodes to be used in electrical storage devices. Typically, the polyvinylidene fluoride is dissolved in an organic solvent and the electrode material, that is, in the case of a positive electrode for lithium ion batteries, the electrochemically active lithium compound and a carbonaceous material, the electrical active lithium compound and a carbonaceous material, is combined with the PVDF solution to form a slurry that is applied to a metal foil or mesh to form the electrode.

The role of the organic solvent is to dissolve PVDF in order to provide good adhesion between the electrode material particles and the metal foil or mesh upon evaporation of the organic solvent. Currently, the organic solvent of choice is N-methyl-2-pyrrolidone (NMP). PVDF binders dissolved in NMP provide superior adhesion and an interconnectivity of all the active ingredients in the electrode composition. The bound ingredients are able to tolerate large volume expansion and contraction during charge and discharge cycles without losing interconnectivity within the electrodes. Interconnectivity of the active ingredients in an electrode is extremely important in battery performance, especially during charging and discharging cycles, as electrons must move across the electrode, and lithium ion mobility requires interconnectivity within the electrode between particles.

Unfortunately, NMP is a toxic material and presents health and environmental issues. It would be desirable to replace NMP as a solvent for PVDF binders. However, NMP is somewhat unique in its ability to dissolve PVDF that is not nearly as soluble in other organic solvents.

To effectively employ PVDF compositions in electrode-forming processes in organic solvent other than NMP, the PVDF must be dispersed in the diluent. However, the dispersion must be compatible with current manufacturing practices and provide desired properties of the intermediate and final products. Some common criteria include: a) stability of the fluoropolymer dispersion, having sufficient shelf-life, b) stability of the slurry after admixing the electroconductive powders with the dispersion, c) appropriate viscosity of the slurry to facilitate good application properties, and d) sufficient interconnectivity within the electrode.

In addition, after the electrodes are assembled in an electrical storage device, the device should be substantially free of moisture and substantially free of hydrophilic groups that may attract moisture.

It is therefore an objective of the present invention to provide stable PVDF dispersions using alternatives to NMP, for use as binders in preparing electrode-forming compositions having suitable application properties for producing high quality electrodes for batteries and other electrical storage devices having interconnectivity.

SUMMARY OF THE INVENTION

The present invention provides a slurry composition comprising (a) an electrochemically active material; (b) a binder comprising (i) a polymer comprising a fluoropolymer dispersed in a liquid medium; and (ii) a polymer comprising an addition polymer comprising constitutional units comprising the residue of a heterocyclic group-containing ethylenically unsaturated monomer.

The present invention also provides a slurry composition comprising (a) an electrically conductive agent; (b) a binder comprising (i) a polymer comprising a fluoropolymer dispersed in a liquid medium; and (ii) a polymer comprising an addition polymer comprising constitutional units comprising the residue of a heterocyclic group-containing ethylenically unsaturated monomer.

The present invention further provides an electrode comprising (a) an electrical current collector; and (b) a film formed on the electrical current collector, wherein the film is deposited from a slurry composition comprising an electrochemically active material; a binder comprising: (i) a polymer comprising a fluoropolymer dispersed in a liquid medium; and (ii) a polymer comprising an addition polymer comprising constitutional units comprising the residue of a heterocyclic group-containing ethylenically unsaturated monomer; and an electrically conductive agent.

The present invention also provides an electrical storage device comprising (a) an electrode comprising an electrical current collector and a film formed on the electrical current collector, wherein the film is deposited from a slurry composition comprising an electrochemically active material; an electrically conductive agent; and a binder comprising: (i) a polymer comprising a fluoropolymer dispersed in a liquid medium; and (ii) a polymer comprising an addition polymer comprising constitutional units comprising the residue of a heterocyclic group-containing ethylenically unsaturated monomer; (b) a counter electrode; and (c) an electrolyte.

DESCRIPTION OF THE DRAWING

FIG. 1 is a graph illustrating the first derivative of Log viscosity versus temperature, wherein the peak maximum is used to determine the dissolution temperature of PVDF dispersed in 1,2,3-triacetoxypropane (triacetin) from the abscissa.

DETAILED DESCRIPTION

The present invention is directed to a slurry composition comprising an electrochemically active material; a binder comprising: (i) a polymer comprising a fluoropolymer dispersed in a liquid medium; and (ii) a polymer comprising an addition polymer comprising constitutional units comprising the residue of a heterocyclic group-containing ethylenically unsaturated monomer. The slurry composition may optionally further comprise an electrically conductive agent and/or an adhesion promoter.

The slurry composition comprises an electrochemically active material. The material constituting the electrochemically active material contained in the slurry is not particularly limited and a suitable material can be selected according to the type of an electrical storage device of interest.

The electrochemically active material may comprise a material for use as an active material for a positive electrode. The electrochemically active material may comprise a material capable of incorporating lithium (including incorporation through lithium intercalation/deintercalation), a material capable of lithium conversion, or combinations thereof. Non-limiting examples of electrochemically active materials capable of incorporating lithium include $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, and combinations thereof. Non-limiting examples of materials capable of lithium conversion include sulfur, $LiO_2$, $FeF_2$ and $FeF_3$, Si, aluminum, tin, SnCo, $Fe_3O_4$, and combinations thereof.

The electrochemically active material may comprise a material for use as an active material for a negative electrode. The electrochemically active material may comprise graphite, lithium titanate, silicon compounds, tin, tin compounds, sulfur, sulfur compounds, or a combination thereof.

The electrochemically active material may be present in the slurry in amounts of 45% to 95% by weight, such as 70% to 98% by weight, based on the total solids weight of the slurry.

According to the present invention, the binder comprises a polymer comprising a fluoropolymer dispersed in liquid medium. The fluoropolymer may serve as all or a component of the binder for the slurry composition.

The fluoropolymer may comprise a (co)polymer comprising the residue of vinylidene fluoride. A non-limiting example of a (co)polymer comprising the residue of vinylidene fluoride is a polyvinylidene fluoride polymer (PVDF). As used herein, the "polyvinylidene fluoride polymer" includes homopolymers, copolymers, such as binary copolymers, and terpolymers, including high molecular weight homopolymers, copolymers, and terpolymers. Such (co)polymers include those containing at least 50 mole percent, such as at least 75 mole %, and at least 80 mole %, and at least 85 mole % of the residue of vinylidene fluoride (also known as vinylidene difluoride). The vinylidene fluoride monomer may be copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride in order to produce the fluoropolymer of the present invention. The fluoropolymer may also comprise a PVDF homopolymer.

The fluoropolymer may comprise a high molecular weight PVDF having a weight average molecular weight of at least 50,000 g/mol, such as at least 100,000 g/mol, and may range from 50,000 g/mol to 1,500,000 g/mol, such as 100,000 g/mol to 1,000,000 g/mol. PVDF is commercially available, e.g., from Arkema under the trademark KYNAR and from Inner Mongolia 3F Wanhao Fluorochemical Co., Ltd.

The fluoropolymer may comprise a nanoparticle. As used herein, the term "nanoparticle" refers to particles having a particle size of less than 1,000 nm. The fluoropolymer may have a particle size of at least 50 nm, such as at least 100 nm, such as at least 250 nm, such as at least 300 nm, and may be no more than 900 nm, such as no more than 600 nm, such as no more than 450 nm, such as no more than 400 nm, such as no more than 300 nm, such as no more than 200 nm. The fluoropolymer nanoparticles may have a particle size of 50 nm to 900 nm, such as 100 nm to 600 nm, such as 250 nm to 450 nm, such as 300 nm to 400 nm, such as 100 nm to 400 nm, such as 100 nm to 300 nm, such as 100 nm to 200 nm. As used herein, the term "particle size" refers to average diameter of the fluoropolymer particles. The particle size referred to in the present disclosure was determined by the following procedure: A sample was prepared by dispersing the fluoropolymer onto a segment of carbon tape that was attached to an aluminum scanning electron microscope (SEM) stub. Excess particles were blown off the carbon tape with compressed air. The sample was then sputter coated with Au/Pd for 20 seconds and was then analyzed in a Quanta 250 FEG SEM (field emission gun scanning electron microscope) under high vacuum. The accelerating voltage was set to 20.00 kV and the spot size was set to 3.0. Images were collected from three different areas on the prepared sample, and ImageJ software was used to measure the diameter of 10 fluoropolymer particles from each area for a total of 30 particle size measurements that were averaged together to determine the average particle size.

The fluoropolymer may be present in the binder in amounts of 40% to 100% by weight, such as 40% to 96% by weight, such as 50% to 90% by weight, based on the total weight of the binder solids.

The liquid medium of the slurry composition may comprise an organic medium. As used herein, the term "organic medium" refers to a liquid medium comprising more than 50% by weight water, based on the total weight of the organic medium. Such organic mediums may comprise less than 40% by weight water, or less than 30% by weight water, or less than 20% by weight water, or less than 10% by weight water, or less than 5% by weight water, or less than 1% by weight water, or less than 0.1% by weight water, based on the total weight of the organic medium, or may be free of water. Organic solvent(s) comprise more than 50% by weight of the organic medium, such as at least 70% by weight, such as at least 80% by weight, such as at least 90% by weight, such as at least 95% by weight, such as at least 99% by weight, such as at least 99.9% by weight, such as 100% by weight, based on the total weight of the organic medium. The organic solvent(s) may comprise 50.1% to 100% by weight, such as 70% to 100% by weight, such as 80% to 100% by weight, such as 90% to 100% by weight, such as 95% to 100% by weight, such as 99% to 100% by weight, such as 99.9% to 100% by weight, based on the total weight of the organic medium.

The organic medium may comprise, consist essentially of, or consist of, for example, ketones such as methyl ethyl ketone, cyclohexanone and isophorone, ethers such as the $C_1$ to $C_4$ alkyl ethers of ethylene and propylene glycol, butyl pyrrolidone, trialkyl phosphate, 1,2,3-triacetoxypropane, 3-methoxy-N,N-dimethylpropanamide, ethyl acetoacetate, gamma-butyrolactone, propylene glycol methyl ether, propylene carbonate, dimethyl adipate, propylene glycol methyl ether acetate, dibasic ester (DBE), dibasic ester 5 (DBE-5), 4-hydroxy-4-methyl-2-pentanone (diacetone alcohol), propylene glycol diacetate, dimethyl phthalate, methyl isoamyl ketone, ethyl propionate, 1-ethoxy-2-propanol, dipropylene glycol dimethyl ether, saturated and unsaturated linear and cyclic ketones (commercially available as a mixture thereof as Eastman™ C-11 Ketone from Eastman Chemical Company), diisobutyl ketone, acetate esters (commercially available as Exxate™ 1000 from Hallstar), tripropylene glycol methyl ether, diethylene glycol ethyl ether acetate, or combinations thereof. The trialkyl phosphate may comprise, for example, trimethylphosphate, triethylphosphate, tripropylphosphate, tributylphosphate, or the like.

The organic medium may optionally have an evaporation rate less than 10 g/min m$^2$, at the dissolution temperature of the fluoropolymer dispersed in the organic medium. Evaporation rates may be measured using ASTM D3539 (1996). According to the present invention, the dissolution temperature of the fluoropolymer dispersed in the organic medium may be determined by measuring complex viscosity of the mixture as a function of temperature. This technique may be applied to fluoropolymers (in addition to other types of polymer) mixed in an organic medium where the total mass of non-volatile solids content of such mixtures is from 44% to 46%, such as 45% of the total mass of the mixture. Complex viscosity may be measured with an Anton-Paar MCR301 rheometer using a 50-millimeter cone and temperature-controlled plate. The complex viscosity of fluoropolymer mixtures is measured over a temperature range from 35° C. to at least 75° C. with a temperature ramp rate of 10° C. per minute, an oscillatory frequency of 1 Hz, and a stress amplitude limit of 90 Pa. The dissolution of fluoropolymer in the organic medium is indicated by a sharp increase in the complex viscosity as temperature increased. The dissolution temperature is defined as the temperature at which the rate of change in viscosity with ramping temperature is highest and is calculated by determining the temperature at which the first derivative with respect to temperature of the $Log_{10}$ of the complex viscosity reaches a maximum. FIG. 1 is a graph illustrating the first derivative of $Log_{10}$ viscosity versus temperature, wherein the peak maximum is used to determine the dissolution temperature of the fluoropolymer polyvinylidene fluoride (PVDF T-1 from Inner Mongolia 3F Wanhao Fluorochemical Co. Ltd.) dispersed in the organic medium 1,2,3-triacetoxypropane (triacetin) from the abscissa. The table below illustrates dissolution temperatures determined according to this method using PVDF T-1 from Inner Mongolia 3F Wanhao Fluorochemical Co. Ltd. (PVDF T-1 has a particle size of about 330 to 380 nm and a weight average molecular weight of about 130,000 to 160,000 g/mol), in various solvents or solvent mixtures as listed.

dissolution temperature of the fluoropolymer dispersed in the organic medium may range from 30° C. to 77° C., such as from 30° C. to 70° C., such as 30° C. to 65° C., such as 30° C. to 60° C., such as 30° C. to 55° C., such as 30° C. to 50° C. The dissolution temperature may be measured according to the method discussed above.

The organic medium may comprise, for example, butyl pyrrolidone, trialkyl phosphate, 1,2,3-triacetoxypropane, 3-methoxy-N,N-dimethylpropanamide, ethyl acetoacetate, gamma-butyrolactone, propylene glycol methyl ether, cyclohexanone, propylene carbonate, dimethyl adipate, propylene glycol methyl ether acetate, dibasic ester (DBE), dibasic ester 5 (DBE-5), 4-hydroxy-4-methyl-2-pentanone (diacetone alcohol), propylene glycol diacetate, dimethyl phthalate, methyl isoamyl ketone, ethyl propionate, 1-ethoxy-2-propanol, dipropylene glycol dimethyl ether, saturated and unsaturated linear and cyclic ketones (commercially available as a mixture thereof as Eastman™ C-11 Ketone from Eastman Chemical Company), diisobutyl ketone, acetate esters (commercially available as Exxate™ 1000 from Hallstar), tripropylene glycol methyl ether, diethylene glycol ethyl ether acetate, or combinations thereof. The trialkyl phosphate may comprise, for example, trimethylphosphate, triethylphosphate, tripropylphosphate, tributylphosphate, or the like.

The organic medium may consist essentially of or consist of, for example, butyl pyrrolidone, trialkyl phosphate, 1,2,3-triacetoxypropane, 3-methoxy-N,N-dimethylpropanamide, ethyl acetoacetate, gamma-butyrolactone, propylene glycol methyl ether, cyclohexanone, propylene carbonate, dimethyl adipate, propylene glycol methyl ether acetate, dibasic ester (DBE), dibasic ester 5 (DBE-5), 4-hydroxy-4-methyl-2-pentanone (diacetone alcohol), propylene glycol diacetate, dimethyl phthalate, methyl isoamyl ketone, ethyl propionate, 1-ethoxy-2-propanol, dipropylene glycol dimethyl ether, saturated and unsaturated linear and cyclic ketones (commercially available as a mixture thereof as Eastman™ C-11 Ketone from Eastman Chemical Company), diisobutyl ketone, acetate esters (commercially available as Exxate™ 1000 from Hallstar), tripropylene glycol methyl ether, diethylene glycol ethyl ether acetate, or combinations thereof. The trialkyl phosphate may comprise, for example, trimethylphosphate, triethylphosphate, tripropylphosphate, tributylphosphate, or the like.

| Solvent | Solvent % mass of organic medium | Cosolvent | Cosolvent % mass of organic medium | PVDF % mass of mixture | Dissolution Temp (° C.) | Evaporation rate at Dissolution Temp (mg/min m$^2$) |
|---|---|---|---|---|---|---|
| N-butylpyrrolidone | 100 | — | — | 45 | 48 | — |
| gamma-butyrolactone | 100 | — | — | 45 | 51 | 9.31 |
| Isophorone | 100 | — | — | 45 | 72 | 16.59 |
| Triacetin | 100 | — | — | 45 | 76 | 0.69 |
| Ethyl Acetoacetate | 100 | — | — | 45 | 76 | 37.76 |
| Triethylphosphate | 80 | Ethyl Acetoacetate | 20 | 45 | 46 | — |
| Triethylphosphate | 80 | Dowanol ™ PM[1] | 20 | 45 | 58 | — |

[1]Propylene glycol methyl ether commercially available from The Dow Chemical Company.

The dissolution temperature of the fluoropolymer dispersed in the organic medium may be less than 77° C., such as less than 70° C., such as less than 65° C., such as less than 60° C., such as less than 55° C., such as less than 50° C. The The organic medium may comprise a primary solvent and a co-solvent that form a homogenous continuous phase with the fluoropolymer as the dispersed phase. The primary solvent and co-solvent and relevant amounts thereof may be selected to provide a dispersion of the fluoropolymer in the organic medium at room temperature, i.e., about 23° C. Both the primary solvent and co-solvent may comprise organic solvent(s). The fluoropolymer may be soluble in the primary solvent if used alone but use of the co-solvent with the primary solvent may allow for the fluoropolymer to be stably dispersed in the organic medium. The primary solvent may comprise, consist essentially of, or consist of, for example, butyl pyrrolidone, a trialkylphosphate, 3-methoxy-N,N-dimethylpropanamide, 1,2,3-triacetoxypropane, or combinations thereof. The co-solvent may comprise, consist essentially of, or consist of, for example, ethyl acetoacetate, gamma-butyrolactone, and/or glycol ethers such as propylene glycol methyl ether, dipropylene glycol methyl ether, propylene glycol monopropyl ether, diethylene glycol monobutyl ether, ethylene glycol monohexyl ether, and the like. The primary solvent may be present in an amount of at least 50% by weight, such as at least 65% by weight, such as at least 75 by weight, and may be present in an amount of no more than 99% by weight, such as no more than 90% by weight, such as no more than 85% by weight, based on the total weight of the organic medium. The primary solvent may be present in an amount of 50% to 99% by weight, such as 65% to 90% by weight, such as 75% to 85% by weight, based on the total weight of the organic medium. The co-solvent may be present in an amount of at least 1% by weight, such as at least 10% by weight, such as at least 15% by weight, and may be present in an amount of no more than 50% by weight, such as no more than 35% by weight, such as no more than 25% by weight. The co-solvent may be present in an amount of 1% to 50% by weight, such as 10% to 35% by weight, such as 15% to 25% by weight, based on the total weight of the organic medium.

The organic medium may also have an evaporation rate greater than 80 g/min m², at 180° C., such as greater than 90 g/min m², at 180° C., such as greater than 100 g/min m², at 180° C.

The liquid medium may comprise an aqueous medium. As used herein, the term "aqueous medium" refers to a liquid medium comprising at least 50% by weight water, based on the total weight of the liquid medium. Such aqueous mediums may comprise less than 40% by weight organic solvent, or less than 30% by weight organic solvent, or less than 20% by weight organic solvent, or less than 10% by weight organic solvent, or less than 5% by weight organic solvent, or less than 1% by weight organic solvent, or less than 0.1% by weight organic solvent, based on the total weight of the aqueous medium, or may be free of organic solvent. Water may comprise more than 50% by weight of the aqueous medium, such as at least 60% by weight, such as at least 70% by weight, such as at least 80% by weight, such as at least 90% by weight, such as at least 95% by weight, such as at least 99% by weight, such as at least 99.9% by weight, such as 100% by weight, based on the total weight of the aqueous medium. Water may comprise 50.1% to 100% by weight, such as 70% to 100% by weight, such as 80% to 100% by weight, such as 90% to 100% by weight, such as 95% to 100% by weight, such as 99% to 100% by weight, such as 99.9% to 100% by weight, based on the total weight of the aqueous medium.

The organic medium may be present in an amount of at least 10% by weight, such as at least 15% by weight, such as at least 20% by weight, such as at least 30% by weight, such as at least 35% by weight, such as at least 40% by weight, and may be present in an amount of no more than 80% by weight, such as no more than 70% by weight, such as no more than 60% by weight, such as no more than 50% by weight, such as no more than 45% by weight, such as no more than 45% by weight, such as no more than 40% by weight, such as no more than 35% by weight, such as no more than 29% by weight, such as no more than 25% by weight, based on the total weight of the slurry composition. The organic medium may be present in an amount of such as 20% to 80% by weight, 10% to 70% by weight, such as 30% to 70% by weight, such as 35% to 60% by weight, such as 40% to 50% by weight, 15% to 60% by weight, 15% to 50% by weight, 15% to 45% by weight, 15% to 40% by weight, 15% to 35% by weight, 15% to 29% by weight, 15% to 25% by weight, based on the total weight of the slurry composition.

The slurry composition may be substantially free, essentially free, or completely free of N-Methyl-2-pyrrolidone (NMP). As used herein, the slurry composition is "substantially free" of NMP if NMP is present, if at all, in an amount of less than 5% by weight, based on the total weight of the slurry composition. As used herein, the slurry composition is "essentially free" of NMP if NMP is present, if at all, in an amount of less than 0.3% by weight, based on the total weight of the slurry composition. As used herein, the slurry composition is "completely free" of NMP if NMP is not present in the slurry composition, i.e., 0.0% by weight, based on the total weight of the slurry composition.

The slurry composition may be substantially free, essentially free, or completely free of ketones such as methyl ethyl ketone, cyclohexanone, isophorone, acetophenone.

The slurry composition may be substantially free, essentially free, or completely free of ethers such as the $C_1$ to $C_4$ alkyl ethers of ethylene or propylene glycol.

The slurry composition further comprises a polymer comprising an addition polymer comprising constitutional units comprising the residue of a heterocyclic group-containing ethylenically unsaturated monomer. As used herein, an ethylenically unsaturated monomer comprising a heterocyclic group refers to a monomer having at least one alpha, beta ethylenic unsaturated group and at least cyclic moiety having at least one atom in addition to carbon in the ring structure, such as, for example, oxygen, nitrogen or sulfur. Non-limiting examples of ethylenically unsaturated monomers comprising a heterocyclic group include epoxy functional ethylenically unsaturated monomers, vinyl pyrrolidone and vinyl caprolactam, among others. The polymer comprising an addition polymer comprising constitutional units comprising the residue of a heterocyclic group-containing ethylenically unsaturated monomer may comprise a dispersant. The addition polymer may assist in dispersing the fluoropolymer, and/or, if present, the electrically conductive agent or electrochemically active material in the liquid medium. The addition polymer comprising constitutional units comprising the residue of a heterocyclic group-containing ethylenically unsaturated monomer may be a component of the slurry composition binder. The addition polymer may comprise at least one phase that is compatible with the fluoropolymer and/or other components of the slurry composition, such as the electrically conductive agent or electrochemically active material, if present, and may further comprise at least one phase that is compatible with the liquid medium. The slurry composition may comprise one, two, three, four or more different addition polymers, and each addition polymer may assist in dispersing a different component of the slurry composition. The addition polymer may comprise any material having phases compatible with both the fluoropolymer and/or, if present, the electrically conductive agent or electrochemically active material, and the liquid medium. As used herein, the term "compatible" means the ability of a material to form a blend with other materials that is and will remain substantially homogenous over time. The fluoropolymer and addition polymer may not be bound by a covalent bond. For example, the addition polymer may comprise a polymer comprising such phases. The addition polymer may be in the form of a block polymer, a random polymer, or a gradient polymer, wherein the phases of present in the different blocks of the polymer, are randomly included throughout the polymer, or are progressively more or less densely present along the polymer backbone, respectively. The addition polymer may comprise addition polymers produced by polymerizing ethylenically unsaturated monomers. The addition polymer may also serve as an additional component of the binder of the slurry composition, and the addition polymer is considered part of the binder irrespective whether it functions as a dispersant or binder or both.

The addition polymer may further comprise functional groups in addition to the heterocyclic groups resulting from the heterocyclic group-containing ethylenically unsaturated monomer. The functional groups may further comprise, for example, active hydrogen functional groups. As used herein, the term "active hydrogen functional groups" refers to those groups that are reactive with isocyanates as determined by the Zerewitinoff test described in the JOURNAL OF THE AMERICAN CHEMICAL SOCIETY, Vol. 49, page 3181 (1927), and include, for example, hydroxyl groups, primary or secondary amino groups, carboxylic acid groups, and thiol groups.

When acid functional groups are present, the addition polymer may have a theoretical acid equivalent weight of at least 350 g/acid equivalent, such as at least 878 g/acid equivalent, such as at least 1,757 g/acid equivalent, and may be no more than 17,570 g/acid equivalent, such as no more than 12,000 g/acid equivalent, such as no more than 7,000 g/acid equivalent. The addition polymer may have a theoretical acid equivalent weight of 350 to 17,570 g/acid equivalent, such as 878 to 12,000 g/acid equivalent, such as 1,757 to 7,000 g/acid equivalent.

The addition polymer may be derived from, and comprise constitutional units comprising the residue of, one or more ethylenically unsaturated monomers, such as those discussed below, in addition to the heterocyclic group-containing ethylenically unsaturated monomer and may be prepared by polymerizing a reaction mixture of such monomers. The mixture of monomers may comprise one or more active hydrogen group-containing ethylenically unsaturated monomers, and combinations thereof. The reaction mixture may additionally comprise other ethylenically unsaturated monomers such as alkyl esters of (meth)acrylic acid and others described below.

As discussed above, the addition polymer comprises constitutional units comprising the residue of a heterocyclic group-containing ethylenically unsaturated monomer. Non-limiting examples of heterocyclic group-containing ethylenically unsaturated monomer include epoxy functional ethylenically unsaturated monomers, such as glycidyl (meth)acrylate, vinyl pyrrolidone and vinyl caprolactam, among others. The constitutional units comprising the residue of the heterocyclic group-containing ethylenically unsaturated monomer may comprise at least 0.1% by weight, such as at least 0.5% by weight, such as at least 1% by weight, such as at least 5% by weight, such as at least 8% by weight, and may be no more than 99% by weight, such as no more than 50% by weight, such as no more than 40% by weight, such as no more than 30% by weight, such as no more than 27% by weight, based on the total weight of the addition polymer. The constitutional units comprising the residue of the heterocyclic group-containing ethylenically unsaturated monomer may comprise 0.5% to 99% by weight, such as 1% to 99% by weight, such as 0.1% to 50% by weight, such as 0.5% to 50% by weight, such as 1% to 40% by weight, such as 5% to 30% by weight, 8% to 27% by weight, based on the total weight of the addition polymer. The addition polymer may be derived from a reaction mixture comprising the heterocyclic group-containing ethylenically unsaturated monomer in an amount of 0.5% to 99% by weight, such as 1% to 99% by weight, such as 0.1% to 50% by weight, such as 0.5% to 50% by weight, such as 1% to 40% by weight, such as 5% to 30% by weight, 8% to 27% by weight, based on the total weight of polymerizable monomers used in the reaction mixture.

In addition, when the addition polymer comprises at least one heterocyclic group, and a compound having a functional group reactive with the heterocyclic group may be grafted onto the addition polymer by reaction with the heterocyclic group. The functional group of the compound may comprise, for example, thiol, amino, hydroxyl, acid, such as a carboxylic acid, or combinations thereof. For example, when epoxide functional groups are present on the addition polymer, the epoxide functional groups on the addition polymer may be reacted with a functional group such as thiol, amino, hydroxyl, carboxylic acid. The ring opening reaction of the epoxide functional group will yield hydroxyl functional groups on the addition polymer. Non-limiting examples of the compound having a functional group reactive with the heterocyclic group include thiols, alcohols, amines and acids, and non-limiting examples of acids include citric acid, tartaric acid or an aromatic acid, such as a beta-hydroxy functional acid including 3-hydroxy-2-naphthoic acid.

The addition polymer may comprise a (meth)acrylic polymer that comprises constitutional units comprising the residue of one or more (meth)acrylic monomers. The (meth)acrylic polymer may be prepared by polymerizing a reaction mixture of alpha, beta-ethylenically unsaturated monomers that comprise one or more (meth)acrylic monomers and optionally other ethylenically unsaturated monomers. As used herein, the term "(meth)acrylic monomer" refers to acrylic acid, methacrylic acid, and monomers derived therefrom, including alkyl esters of acrylic acid and methacrylic acid, and the like. As used herein, the term "(meth)acrylic polymer" refers to a polymer derived from or comprising constitutional units comprising the residue of one or more (meth)acrylic monomers. The mixture of monomers may comprise one or more active hydrogen group-containing (meth)acrylic monomers, ethylenically unsaturated monomers comprising a heterocyclic group, and other ethylenically unsaturated monomers.

The addition polymer may comprise constitutional units comprising the residue of an alpha, beta-ethylenically unsaturated carboxylic acid. Non-limiting examples of alpha, beta-ethylenically unsaturated carboxylic acids include those containing up to 10 carbon atoms such as acrylic acid and methacrylic acid. Non-limiting examples of other unsaturated acids are alpha, beta-ethylenically unsaturated dicarboxylic acids such as maleic acid or its anhydride, fumaric acid and itaconic acid. Also, the half esters of these dicarboxylic acids may be employed. The constitutional units comprising the residue of the alpha, beta-ethylenically unsaturated carboxylic acids may comprise at least 1% by weight, such as at least 2% by weight, such as at least 5% by weight, and may be no more than 50% by weight, such as no more than 20% by weight, such as no more than 10% by weight, such as no more than 5% by weight, based on the total weight of the addition polymer. The constitutional units comprising the residue of the alpha, beta-ethylenically unsaturated carboxylic acids may comprise 1% to 50% by weight, 2% to 50% by weight, such as 2% to 20% by weight, such as 2% to 10% by weight, such as 2% to 5% by weight, such as 1% to 5% by weight, based on the total weight of the addition polymer. The addition polymer may be derived from a reaction mixture comprising the alpha, beta-ethylenically unsaturated carboxylic acids in an amount of 1% to 50% by weight, 2% to 50% by weight, such as 2% to 20% by weight, such as 2% to 10% by weight, such as 2% to 5% by weight, such as 1% to 5% by weight, based on the total weight of polymerizable monomers used in the reaction mixture. The inclusion of constitutional units comprising the residue of an alpha, beta-ethylenically unsaturated carboxylic acids in the addition polymer results in an addition polymer comprising at least one carboxylic acid group which may assist in providing stability to the dispersion.

The addition polymer may comprise constitutional units comprising the residue of an alkyl esters of (meth)acrylic acid containing from 1 to 3 carbon atoms in the alkyl group. Non-limiting examples of alkyl esters of (meth)acrylic acid containing from 1 to 3 carbon atoms in the alkyl group include methyl (meth)acrylate and ethyl (meth)acrylate. The constitutional units comprising the residue of the alkyl esters of (meth)acrylic acid containing from 1 to 3 carbon atoms in the alkyl group may comprise at least 1% by weight, such as at least 20% by weight, such as at least 30% by weight, such as at least 40% by weight, such as at least 45% by weight, such as at least 50% by weight, and may be no more than 99% by weight, such as no more than 98% by weight, such as no more than 96% by weight, such as no more than 90% by weight, such as no more than 80% by weight, such as no more than 75% by weight, based on the total weight of the addition polymer. The constitutional units comprising the residue of the alkyl esters of (meth)acrylic acid containing from 1 to 3 carbon atoms in the alkyl group may comprise 1% to 99% by weight, such as 1% to 90% by weight, such as 20% to 98% by weight, such as 30% to 96% by weight, such as 30% to 90% by weight, 40% to 90% by weight, such as 40% to 80% by weight, such as 45% to 75% by weight, based on the total weight of the addition polymer. The addition polymer may be derived from a reaction mixture comprising the alkyl esters of (meth)acrylic acid containing from 1 to 3 carbon atoms in the alkyl group in an amount of 1% to 99% by weight, such as 1% to 90% by weight, such as 20% to 98% by weight, such as 30% to 96% by weight, such as 30% to 90% by weight, 40% to 90% by weight, such as 40% to 80% by weight, such as 45% to 75% by weight, based on the total weight of polymerizable monomers used in the reaction mixture.

The addition polymer may comprise constitutional units comprising the residue of an alkyl esters of (meth)acrylic acid containing from 4 to 18 carbon atoms in the alkyl group. Non-limiting examples of alkyl esters of (meth)acrylic acid containing from 4 to 18 carbon atoms in the alkyl group include butyl (meth)acrylate, hexyl (meth)acrylate, octyl (meth)acrylate, isodecyl (meth)acrylate, stearyl (meth)acrylate, 2-ethylhexyl (meth)acrylate, decyl (meth)acrylate and dodecyl (meth)acrylate. The constitutional units comprising the residue of the alkyl esters of (meth)acrylic acid containing from 4 to 18 carbon atoms in the alkyl group may comprise at least 2% by weight, such as at least 5% by weight, such as at least 10% by weight, such as at least 15% by weight, such as at least 20% by weight, and may be no more than 70% by weight, such as no more than 60% by weight, such as no more than 50% by weight, such as no more than 40% by weight, such as no more than 35% by weight, based on the total weight of the addition polymer. The constitutional units comprising the residue of the alkyl esters of (meth)acrylic acid containing from 4 to 18 carbon atoms in the alkyl group may comprise 2% to 70% by weight, such as 2% to 60% by weight, such as 5% to 50% by weight, 10% to 40% by weight, such as 15% to 35% by weight, based on the total weight of the addition polymer. The addition polymer may be derived from a reaction mixture comprising the alkyl esters of (meth)acrylic acid containing from 4 to 18 carbon atoms in the alkyl group in an amount of 2% to 70% by weight, such as 2% to 60% by weight, such as 5% to 50% by weight, 10% to 40% by weight, such as 15% to 35% by weight, based on the total weight of polymerizable monomers used in the reaction mixture.

The addition polymer may comprise constitutional units comprising the residue of a hydroxyalkyl ester. Non-limiting examples of hydroxyalkyl esters include hydroxyethyl (meth)acrylate and hydroxypropyl (meth)acrylate. The constitutional units comprising the residue of the hydroxyalkyl ester may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the hydroxyalkyl ester may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the hydroxyalkyl ester in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture. The inclusion of constitutional units comprising the residue of a hydroxyalkyl ester in the addition polymer results in an addition polymer comprising at least one hydroxyl group (although hydroxyl groups may be included by other methods). Hydroxyl groups resulting from inclusion of the hydroxyalkyl esters (or incorporated by other means) may react with a separately added crosslinking agent that comprises functional groups reactive with hydroxyl groups such as, for example, an aminoplast, phenolplast, polyepoxides and blocked polyisocyanates, or with N-alkoxymethyl amide groups or blocked isocyanato groups present in the addition polymer when self-crosslinking monomers that have groups that are reactive with the hydroxyl groups are incorporated into the addition polymer.

As noted above, the addition polymer may comprise constitutional units comprising the residue of a self-crosslinking monomer, and the addition polymer may comprise a self-crosslinking addition polymer. As used herein, the term "self-crosslinking monomer" refers to monomers that incorporate functional groups that may react with other functional groups present on the addition polymer to a crosslink between the addition polymer or more than one addition polymer. Non-limiting examples of self-crosslinking monomers include N-alkoxymethyl (meth)acrylamide monomers such as N-butoxymethyl (meth)acrylamide and N-isopropoxymethyl (meth)acrylamide, as well as self-crosslinking monomers containing blocked isocyanate groups, such as isocyanatoethyl (meth)acrylate in which the isocyanato group is reacted ("blocked") with a compound that unblocks at curing temperature. Examples of suitable blocking agents include epsilon-caprolactone and methylethyl ketoxime. The constitutional units comprising the residue of the self-crosslinking monomer may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the self-crosslinking monomer may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the self-crosslinking monomer in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture.

The addition polymer may comprise constitutional units comprising the residue of other ethylenically unsaturated monomers. Non-limiting examples of other ethylenically unsaturated monomers include vinyl aromatic compounds such as styrene, alpha-methyl styrene, alpha-chlorostyrene and vinyl toluene; organic nitriles such as acrylonitrile and methacrylonitrile; allyl monomers such as allyl chloride; allyl cyanide and monomeric dienes such as 1,3-butadiene and 2-methyl-1,3-butadiene; and acetoacetoxyalkyl (meth) acrylates such as acetoacetoxyethyl methacrylate (AAEM) (which may be self-crosslinking). The constitutional units comprising the residue of the other ethylenically unsaturated monomers may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the other ethylenically unsaturated monomers may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the other ethylenically unsaturated monomers in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture.

The slurry composition may optionally further comprise a second addition polymer. The second addition polymer may be free of heterocyclic groups and may comprise constitutional units comprising the residue of any of the ethylenically unsaturated monomers discussed above in the ranges above, with the exception of the heterocyclic group-containing monomers.

The second addition polymer may comprise, consist essentially of, or consist of constitutional units comprising the residue of 50% to 80% by weight of alkyl esters of (meth)acrylic acid containing from 1 to 3 carbon atoms in the alkyl group; 20% to 40% by weight of alkyl esters of (meth)acrylic acid containing from 4 to 18 carbon atoms in the alkyl group; 0.1% to 10% by weight of hydroxyalkyl ester; and 0.1% to 10% by weight of alpha, beta-ethylenically unsaturated carboxylic acid, based on the total weight of the addition polymer.

The addition polymer may comprise, consist essentially of, or consist of constitutional units comprising the residue of 30% to 70% by weight of alkyl esters of (meth)acrylic acid containing from 1 to 3 carbon atoms in the alkyl group; 20% to 50% by weight of alkyl esters of (meth)acrylic acid containing from 4 to 18 carbon atoms in the alkyl group; 1% to 20% by weight of heterocyclic group-containing ethylenically unsaturated monomer; 0.1% to 10% by weight of hydroxyalkyl ester; and 0.1% to 10% by weight of alpha, beta-ethylenically unsaturated carboxylic acid, based on the total weight of the addition polymer.

The addition polymer may comprise, consist essentially of, or consist of constitutional units comprising the residue of 20% to 60% by weight of alkyl esters of (meth)acrylic acid containing from 1 to 3 carbon atoms in the alkyl group; 25% to 65% by weight of alkyl esters of (meth)acrylic acid containing from 4 to 18 carbon atoms in the alkyl group; 10% to 30% by weight of heterocyclic group-containing ethylenically unsaturated monomer; 0.1% to 10% by weight of hydroxyalkyl ester; and 0.1% to 10% by weight of alpha, beta-ethylenically unsaturated carboxylic acid, based on the total weight of the addition polymer.

The monomers and relative amounts may be selected such that the resulting addition polymer has a Tg of 100° C. or less, typically from −50° C. to +70° C., such as −50° C. to 0° C. A lower Tg that is below 0° C. may be desirable to ensure acceptable battery performance at low temperature.

The addition polymer may be prepared by conventional free radical initiated solution polymerization techniques in which the polymerizable monomers are dissolved in a second organic medium comprising a solvent or a mixture of solvents and polymerized in the presence of a free radical initiator until conversion is complete. The second organic medium used to prepare the addition polymer may be the same as the organic medium present in the slurry composition such that the composition of the organic medium is unchanged by addition of the addition polymer solution. For example, the second organic medium may comprise the same primary solvent(s) and co-solvent(s) in the same ratios as the organic medium of the slurry composition. Alternatively, the second organic medium used to prepare the addition polymer may be different and distinct from the organic medium of the slurry composition. The second organic medium used to produce the addition polymer may comprise any suitable organic solvent or mixture of solvents, including those discussed above with respect to the organic medium, such as, for example, triethylphosphate.

Examples of free radical initiators are those which are soluble in the mixture of monomers such as azobisisobutyronitrile, azobis(alpha, gamma-methylvaleronitrile), tertiary-butyl perbenzoate, tertiary-butyl peracetate, benzoyl peroxide, ditertiary-butyl peroxide and tertiary amyl peroxy 2-ethylhexyl carbonate.

Optionally, a chain transfer agent which is soluble in the mixture of monomers such as alkyl mercaptans, for example, tertiary-dodecyl mercaptan; ketones such as methyl ethyl ketone, chlorohydrocarbons such as chloroform can be used. A chain transfer agent provides control over the molecular weight to give products having required viscosity for various coating applications. Tertiary-dodecyl mercaptan is preferred because it results in high conversion of monomer to polymeric product.

To prepare the addition polymer, the solvent may be first heated to reflux and the mixture of polymerizable monomers containing the free radical initiator may be added slowly to the refluxing solvent. The reaction mixture is then held at polymerizing temperatures so as to reduce the free monomer content, such as to below 1.0 percent and usually below 0.5 percent, based on the total weight of the mixture of polymerizable monomers.

For use in the slurry composition of the invention, the addition polymers prepared as described above usually have a weight average molecular weight of about 5000 to 500,000 g/mol, such as 10,000 to 100,000 g/mol, and 25,000 to 50,000 g/mol.

The addition polymer may be present in the binder in amounts of 2% to 20% by weight, such as 5% to 15% by weight, based on the total weight of the binder solids.

As noted above, the slurry composition may optionally further comprise a separately added crosslinking agent for reaction with the addition polymer. The crosslinking agent should be soluble or dispersible in the liquid medium and be reactive with active hydrogen groups of the addition polymer, such as the carboxylic acid groups and the hydroxyl groups, if present. Non-limiting examples of suitable crosslinking agents include aminoplast resins, blocked polyisocyanates and polyepoxides.

Examples of aminoplast resins for use as a crosslinking agent are those which are formed by reacting a triazine such as melamine or benzoguanamine with formaldehyde. These reaction products contain reactive N-methylol groups. Usually, these reactive groups are etherified with methanol, ethanol, butanol including mixtures thereof to moderate their reactivity. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec Industries.

Blocked polyisocyanate crosslinking agents are typically diisocyanates such as toluene diisocyanate, 1,6-hexamethylene diisocyanate and isophorone diisocyanate including isocyanato dimers and trimers thereof in which the isocyanate groups are reacted ("blocked") with a material such as epsilon-caprolactone and methylethyl ketoxime. At curing temperatures, the blocking agents unblock exposing isocyanate functionality that is reactive with the hydroxyl functionality associated with the (meth)acrylic polymer. Blocked polyisocyanate crosslinking agents are commercially available from Covestro as DESMODUR BL.

Examples of polyepoxide crosslinking agents are epoxy-containing (meth)acrylic polymers such as those prepared from glycidyl methacrylate copolymerized with other vinyl monomers, polyglycidyl ethers of polyhydric phenols such as the diglycidyl ether of bisphenol A; and cycloaliphatic polyepoxides such as 3,4-epoxycyclohexylmethyl-3,4-epoxycyclohexane carboxylate and bis(3,4-epoxy-6-methylcyclohexyl-methyl) adipate.

In addition to promoting the cross-linking of the addition polymer, the crosslinking agents, including those associated with crosslinking monomers and separately added crosslinking agents, react with the hydrophilic groups, such as active hydrogen functional groups of the addition polymer preventing these groups from absorbing moisture that could be problematic in a lithium ion battery.

The separately added crosslinker may be present in the binder in amounts of up to 15% by weight, such as 1% to 15% by weight, the % by weight being based on the total weight of the binder solids.

The slurry composition further comprises an adhesion promoter. The adhesion promoter may comprise a polyvinylidene fluoride copolymer different than the fluoropolymer described above, an acid-functional polyolefin, or a thermoplastic material.

The polyvinylidene fluoride copolymer adhesion promoter comprises constitutional units comprising the residue of vinylidene fluoride and at least one of (i) a (meth)acrylic acid; and/or (ii) a hydroxyalkyl (meth)acrylate. The (meth)acrylic acid may comprise acrylic acid, methacrylic acid, or combinations thereof. The hydroxyalkyl (meth)acrylate may comprise a $C_1$ to $C_5$ hydroxyalkyl (meth)acrylate, such as, for example, hydroxyethyl (meth)acrylate, 2-hydroxypropyl (meth)acrylate, 2-hydroxybutyl (meth)acrylate, or combinations thereof. A commercially available example of such an addition polymer includes SOLEF 5130, available from Solvay. Unlike the fluoropolymer discussed above, the polyvinylidene fluoride copolymer may be dispersed or solubilized in the organic medium of the slurry composition.

The acid-functional polyolefin adhesion promoter comprises an ethylene-(meth)acrylic acid copolymer, such as an ethylene-acrylic acid copolymer or an ethylene-methacrylic acid copolymer. The ethylene-acrylic acid copolymer may comprise constitutional units comprising 10% to 50% by weight acrylic acid, such as 15% to 30% by weight, such as 17% to 25% by weight, such as about 20% by weight, based on the total weight of the ethylene-acrylic acid copolymer, and 50% to 90% by weight ethylene, such as 70% to 85% by weight, such as 75% to 83% by weight, such as about 80% by weight, based on the total weight of the ethylene-acrylic acid copolymer. A commercially available example of such an addition polymer includes PRIMACOR 5980i, available from the Dow Chemical Company.

The adhesion promoter may be present in the slurry composition in an amount of 10% to 60% by weight, 20% to 60% by weight, such as 30% to 60% by weight, such as 10% to 50% by weight, such as 15% to 40% by weight, such as 20% to 30% by weight, such as 35% to 35% by weight, based on the total weight of the binder solids.

The binder typically has a resin solids content of from 30% to 80% by weight, such as 40% to 70% by weight, based on the total weight of the binder dispersion. As used herein, the term "resin solids" may be used synonymously with "binder solids" and include the fluoropolymer, addition polymer, and, if present, the adhesion promoter and separately added crosslinking agent. As used herein, the term "binder dispersion" refers to a dispersion of the binder solids in the liquid medium. The fluoropolymer may be present in in the binder in amounts of 40% to 96% by weight, such as 50% to 90% by weight; the addition polymer may be present in amounts of 2% to 20% by weight, such as 5% to 15% by weight; the adhesion promoter may be present in the slurry composition in an amount of 10% to 60% by weight, 20% to 60% by weight, such as 30% to 60% by weight, such as 10% to 50% by weight, such as 15% to 40% by weight, such as 20% to 30% by weight, such as 35% to 35% by weight; and the separately added crosslinker may be present in amounts of up to 15% by weight, such as 1% to 15% by weight, the % by weight being based on the total weight of the binder solids. The liquid medium may be present in the binder dispersion in amounts of 20% to 70% by weight, such as 30% to 60% by weight, based on total weight of the binder dispersion.

The binder solids may be present in the slurry in amounts of 1% to 20% by weight, such as 1% to 10% by weight, such as 5% to 10% percent by weight, based on the total solids weight of the slurry.

The slurry composition of the present invention may optionally further comprise an electrically conductive agent.

Non-limiting examples of electrically conductive agents include carbonaceous materials such as, activated carbon, carbon black such as acetylene black and furnace black, graphite, graphene, carbon nanotubes, carbon fibers, fullerene, and combinations thereof. The electrically conductive material may also comprise any active carbon that has a high-surface area, such as a BET surface area of greater than 100 m²/g. As used herein, the term "BET surface area" refers to a specific surface area determined by nitrogen adsorption according to the ASTM D 3663-78 standard based on the Brunauer-Emmett-Teller method described in the periodical "The Journal of the American Chemical Society", 60, 309 (1938). In some examples, the conductive carbon can have a BET surface area of 100 m²/g to 1,000 m²/g, such as 150 m²/g to 600 m²/g, such as 100 m²/g to 400 m²/g, such as 200 m²/g to 400 m²/g. In some examples, the conductive carbon can have a BET surface area of about 200 m²/g. A suitable conductive carbon material is LITX 200 commercially available from Cabot Corporation. The conductive carbon material can be present in the slurry in amounts of 2 to 20, typically 5 to 10 percent by weight based on total solids weight of the slurry.

The electrically conductive agent may be present in the slurry in amounts of 1% to 20% by weight, such as 5% to 10% by weight, based on the total solids weight of the slurry.

The slurry composition may be in the form of an electrode slurry composition comprising the binder, electrochemically active material and electrically conductive material, each as described above. The electrode slurry may comprise such materials present in the slurry composition in the amounts described above. For example, the electrode slurry composition may comprise the electrochemically active material present in amounts of 45% to 95% by weight, such as 70% to 98% by weight; the binder present in amounts of 1% to 20% by weight, such as 1% to 10% by weight, such as 5% to 10% percent by weight; and the electrically conductive agent present in amounts of 1% to 20% by weight, such as 5% to 10% by weight, the percentages by weight based on the total solids weight of the electrode slurry composition.

The electrode slurry composition comprising the liquid medium, electrochemically active material, electrically conductive material, binder dispersion (which may include a separately added crosslinking agent), additional liquid medium, if needed, and optional ingredients, may be prepared by combining the ingredients to form the slurry. These substances can be mixed together by agitation with a known means such as a stirrer, bead mill or high-pressure homogenizer.

As for mixing and agitation for the manufacture of the electrode slurry composition, a mixer capable of stirring these components to such an extent that satisfactory dispersion conditions are met should be selected. The degree of dispersion can be measured with a particle gauge and mixing and dispersion are preferably carried out to ensure that agglomerates of 100 microns or more are not present. Examples of the mixers which meet this condition include ball mill, sand mill, pigment disperser, grinding machine, extruder, rotor stator, pug mill, ultrasonic disperser, homogenizer, planetary mixer, Hobart mixer, and combinations thereof.

The slurry composition may have a solids content of at least 30% by weight, such as at least 40% by weight, such as at least 50% by weight, such as at least 55%, such as at least 60%, such as at least 65%, such as at least 71%, such as at least 75%, and may be no more than 90% by weight, such as no more than 85% by weight, such as no more than 75% by weight, the % by weight based on the total weight of the slurry composition. The slurry composition may have a solids content of 30% to 90% by weight, such as 40% to 85% by weight, such as 50% to 85% by weight, such as 55% to 85% by weight, such as 60% to 85% by weight, such as 65% to 85% by weight, such as 71% to 85% by weight, such as 75% to 85% by weight, based on the total weight of the slurry composition.

The present invention is also directed to an electrode comprising an electrical current collector and a film formed on the electrical current collector, wherein the film is deposited from the electrode slurry composition described above. The electrode may be a positive electrode or a negative electrode and may be manufactured by applying the above-described slurry composition to the surface of the current collector to form a coating film, and subsequently drying and/or curing the coating film. The coating film may have a thickness of 1 to 500 microns (µm), such as 1 to 150 µm, such as 25 to 150 µm, such as 30 to 125 µm. The coating film may comprise a cross-linked coating. The current collector may comprise a conductive material, and the conductive material may comprise a metal such as iron, copper, aluminum, nickel, and alloys thereof, as well as stainless steel. For example, the current collector may comprise aluminum or copper in the form of a mesh, sheet or foil. Although the shape and thickness of the current collector are not particularly limited, the current collector may have a thickness of about 0.001 to 0.5 mm, such as a mesh, sheet or foil having a thickness of about 0.001 to 0.5 mm.

The current collector may be pretreated with a pretreatment composition prior to depositing the slurry composition. As used herein, the term "pretreatment composition" refers to a composition that upon contact with the current collector, reacts with and chemically alters the current collector surface and binds to it to form a protective layer. The pretreatment composition may be a pretreatment composition comprising a group IIIB and/or IVB metal. As used herein, the term "group IIIB and/or IVB metal" refers to an element that is in group IIIB or group IVB of the CAS Periodic Table of the Elements as is shown, for example, in the Handbook of Chemistry and Physics, $63^{rd}$ edition (1983). Where applicable, the metal themselves may be used, however, a group IIIB and/or IVB metal compound may also be used. As used herein, the term "group IIIB and/or IVB metal compound" refers to compounds that include at least one element that is in group IIIB or group IVB of the CAS Periodic Table of the Elements. Suitable pretreatment compositions and methods for pretreating the current collector are described in U.S. Pat. No. 9,273,399 at col. 4, line 60 to col. 10, line 26, the cited portion of which is incorporated herein by reference. The pretreatment composition may be used to treat current collectors used to produce positive electrodes or negative electrodes.

The method of applying the slurry composition to the current collector is not particularly limited. The slurry composition may be applied by doctor blade coating, dip coating, reverse roll coating, direct roll coating, gravure coating, extrusion coating, immersion or brushing. Although the application quantity of the slurry composition is not particularly limited, the thickness of the coating formed after the liquid medium is removed may be at least 1 micron, such as 1 to 150 microns (µm), such as 25 to 150 µm, such as 30 to 125 µm.

Drying and/or crosslinking the coating film after application, if applicable, can be done, for example, by heating at elevated temperature, such as at least 50° C., such as at least 60° C., such as 50-145° C., such as 60-120° C., such as 65-110° C. The time of heating will depend somewhat on the temperature. Generally, higher temperatures require less time for curing. Typically, curing times are for at least 5 minutes, such as 5 to 60 minutes. The temperature and time should be sufficient such that the dispersant in the cured film is crosslinked (if applicable), that is, covalent bonds are formed between co-reactive groups on the dispersant polymer chain, such as carboxylic acid groups and hydroxyl groups and the N-methylol and/or the N-methylol ether groups of an aminoplast, isocyanato groups of a blocked polyisocyanate crosslinking agent, or in the case of a self-curing dispersant, the N-alkoxymethyl amide groups or blocked isocyanato groups. The extent of cure or crosslinking may be measured as resistance to solvents such as methyl ethyl ketone (MEK). The test is performed as described in ASTM D-540293. The number of double rubs, one back and forth motion, is reported. This test is often referred to as "MEK Resistance". Accordingly, the dispersant and crosslinking agent (inclusive of self-curing dispersants and dispersants with separately added crosslinking agents) is isolated from the binder composition, deposited as a film and heated for the temperature and time that the binder film is heated. The film is then measured for MEK Resistance with the number of double rubs reported. Accordingly, a crosslinked dispersant will have an MEK Resistance of at least 50 double rubs, such as at least 75 double rubs. Also, the crosslinked dispersant may be substantially solvent resistant to the solvents of the electrolyte mentioned below. Other methods of drying the coating film include ambient temperature drying, microwave drying and infrared drying, and other methods of curing the coating film include e-beam curing and UV curing.

During discharge of a lithium ion electrical storage device, lithium ions may be released from the negative electrode and carry the current to the positive electrode. This process may include the process known as deintercalation. During charging, the lithium ions migrate from the electrochemically active material in the positive electrode to the negative electrode where they become embedded in the electrochemically active material present in the negative electrode. This process may include the process known as intercalation.

The present invention is also directed to an electrical storage device. An electrical storage device according to the present invention can be manufactured by using the above electrodes prepared from the electrode slurry composition of the present invention. The electrical storage device comprises an electrode, a counter electrode and an electrolyte. The electrode, counter-electrode or both may comprise the electrode of the present invention, as long as one electrode is a positive electrode and one electrode is a negative electrode. Electrical storage devices according to the present invention include a cell, a battery, a battery pack, a secondary battery, a capacitor, and a supercapacitor.

The electrical storage device includes an electrolytic solution and can be manufactured by using parts such as a separator in accordance with a commonly used method. As a more specific manufacturing method, a negative electrode and a positive electrode are assembled together with a separator there between, the resulting assembly is rolled or bent in accordance with the shape of a battery and put into a battery container, an electrolytic solution is injected into the battery container, and the battery container is sealed up. The shape of the battery may be like a coin, button or sheet, cylindrical, square or flat.

The electrolytic solution may be liquid or gel, and an electrolytic solution which can serve effectively as a battery may be selected from among known electrolytic solutions which are used in electrical storage devices in accordance with the types of a negative electrode active material and a positive electrode active material. The electrolytic solution may be a solution containing an electrolyte dissolved in a suitable solvent. The electrolyte may be conventionally known lithium salt for lithium ion secondary batteries. Examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiB(C_6H_5)_4$, $LiCF_3SO_3$, $LiCH_3SO_3$, $LiC_4F_9SO_3$, $Li(CF_3SO_2)_2N$, $LiB_4CH_3SO_3Li$ and $CF_3SO_3Li$. The solvent for dissolving the above electrolyte is not particularly limited and examples thereof include carbonate compounds such as propylene carbonate, ethylene carbonate, butylene carbonate, dimethyl carbonate, methyl ethyl carbonate and diethyl carbonate; lactone compounds such as 7-butyl lactone; ether compounds such as trimethoxymethane, 1,2-dimethoxyethane, diethyl ether, 2-ethoxyethane, tetrahydrofuran and 2-methyltetrahydrofuran; and sulfoxide compounds such as dimethyl sulfoxide. The concentration of the electrolyte in the electrolytic solution may be 0.5 to 3.0 mole/L, such as 0.7 to 2.0 mole/L.

As used herein, the term "polymer" refers broadly to oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, 2-ethylacrylic acid, etc., and their $C_1$-$C_4$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

As used herein molecular weights are determined by gel permeation chromatography using a polystyrene standard. Unless otherwise indicated molecular weights are on a weight average basis.

The term "glass transition temperature" as used herein is a theoretical value being the glass transition temperature as calculated by the method of Fox on the basis of monomer composition of the monomer charge according to T. G. Fox, Bull. Am. Phys. Soc. (Ser. II) 1, 123 (1956) and J. Brandrup, E. H. Immergut, Polymer Handbook $3^{rd}$ edition, John Wiley, New York, 1989.

As used herein, unless otherwise defined, the term substantially free means that the component is present, if at all, in an amount of less than 5% by weight, based on the total weight of the slurry composition.

As used herein, unless otherwise defined, the term essentially free means that the component is present, if at all, in an amount of less than 1% by weight, based on the total weight of the slurry composition.

As used herein, unless otherwise defined, the term completely free means that the component is not present in the slurry composition, i.e., 0.00% by weight, based on the total weight of the slurry composition.

As used herein, the term "total solids" refers to the non-volatile components of the slurry composition of the present invention and specifically excludes the liquid medium.

As used herein, the term "consists essentially of" includes the recited material or steps and those that do not materially affect the basic and novel characteristics of the claimed invention.

As used herein, the term "consists of" excludes any element, step or ingredient not recited.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" electrochemically active material, "a" fluoropolymer, "an" addition polymer, and "an" electrically conductive agent, "an" adhesion promoter, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described. Although various embodiments of the invention have been described in terms of "comprising", embodiments consisting essentially of or consisting of are also within the scope of the present invention.

As used herein, the terms "on," "onto," "applied on," "applied onto," "formed on," "deposited on," "deposited onto," mean formed, overlaid, deposited, or provided on but not necessarily in contact with the surface. For example, a composition "deposited onto" a substrate does not preclude the presence of one or more other intervening coating layers of the same or different composition located between the electrodepositable coating composition and the substrate.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

Each of the characteristics and examples described above, and combinations thereof, may be said to be encompassed by the present invention. The present invention is thus drawn to the following nonlimiting aspects:

1. A slurry composition comprising:
    (a) a binder comprising:
        (i) a polymer comprising a fluoropolymer dispersed in a liquid medium; and
        (ii) a polymer comprising an addition polymer comprising constitutional units comprising the residue of a heterocyclic group-containing ethylenically unsaturated monomer; and at least one of
    (b1) an electrochemically active material, and
    (b2) an electrically conductive agent.
2. The slurry composition of Aspect 1, wherein the heterocyclic group-containing ethylenically unsaturated monomer comprises an epoxy functional ethylenically unsaturated monomer, vinyl pyrrolidone, or combinations thereof.
3. The slurry composition of Aspects 1 or 2, wherein the addition polymer further comprises constitutional units comprising the residue of methyl (meth)acrylate.
4. The slurry composition of Aspect 3, wherein the addition polymer comprises constitutional units comprising the residues of the epoxy functional ethylenically unsaturated monomer and of methyl (meth)acrylate.
5. The slurry composition of Aspect 4, wherein the addition polymer comprises constitutional units comprising 0.1% to 50% by weight of the residue of the epoxy functional ethylenically unsaturated monomer and 1% to 90% by weight of the residue of methyl (meth)acrylate, the % by weight based on the total weight of the addition polymer.
6. The slurry composition of any one of Aspects 1 to 5, wherein the addition polymer comprises constitutional units comprising the residue of vinyl pyrrolidone and methyl (meth)acrylate.
7. The slurry composition of Aspect 6, wherein the addition polymer comprises constitutional units comprising 1% to 99% by weight of the residue of vinyl pyrrolidone and 1% to 99% by weight of methyl (meth)acrylate, the % by weight based on the total weight of the addition polymer.
8. The slurry composition of any one of Aspects 1 to 7, wherein a compound having a functional group reactive with the heterocyclic group is grafted onto the addition polymer by reaction with the heterocyclic group.
9. The slurry composition of Aspect 8, wherein the compound having a functional group reactive with the heterocyclic group comprises an aromatic acid.

10. The slurry composition of Aspect 9, wherein the aromatic acid comprises a beta-hydroxy functional acid.
11. The slurry composition of any one of Aspects 1 to 10, wherein the liquid medium comprises an organic medium has an evaporation rate less than 10 g/min m$^2$, at the dissolution temperature of fluoropolymer in the organic medium.
12. The slurry composition of Aspect 11, wherein the organic medium has an evaporation rate greater than 80 g/min m$^2$, at 180° C.
13. The slurry composition of Aspects 11 or 12, wherein the organic medium comprises butyl pyrrolidone, trialkyl phosphate such as triethylphosphate, 1,2,3-triacetoxypropane, 3-methoxy-N,N-dimethylpropanamide, ethyl acetoacetate, gamma-butyrolactone, propylene glycol methyl ether, cyclohexanone, propylene carbonate, dimethyl adipate, propylene glycol methyl ether acetate, dibasic ester (DBE), dibasic ester 5, 4-hydroxy-4-methyl-2-pentanone, propylene glycol diacetate, dimethyl phthalate, methyl isoamyl ketone, ethyl propionate, 1-ethoxy-2-propanol, dipropylene glycol dimethyl ether, saturated and unsaturated linear and cyclic ketones, diisobutyl ketone, acetate esters, tripropylene glycol methyl ether, diethylene glycol ethyl ether acetate, or combinations thereof.
14. The slurry composition of Aspects 11 or 12, wherein the organic medium comprises a primary solvent and a co-solvent, the primary solvent comprising butyl pyrrolidone, a trialkylphosphate such as triethylphosphate, 3-methoxy-N,N-dimethylpropanamide, 1,2,3-triacetoxypropane, or combinations thereof, and the co-solvent comprising ethyl acetoacetate, gamma-butyrolactone, propylene glycol methyl ether, dipropylene glycol methyl ether, propylene glycol monopropyl ether, diethylene glycol monobutyl ether, ethylene glycol monohexyl ether, or combinations thereof.
15. The slurry composition of Aspect 14, wherein the primary solvent is present in an amount of 50% to 99% by weight, such as 65% to 90% by weight, such as 75% to 85% by weight, and the co-solvent is present in an amount of 1% to 50% by weight, such as 10% to 35% by weight, such as 15% to 25% by weight, each based on the total weight of the organic medium.
16. 14. The slurry composition of Aspect 14 or 15, wherein the primary solvent comprises a trialkylphosphate such as triethylphosphate and a co-solvent.
17. The slurry composition of Aspects 14 or 15, wherein the organic medium comprises triethyl phosphate as the primary solvent and ethyl acetoacetate as a co-solvent.
18. The slurry composition of any one of Aspects 11 to 17, wherein the addition polymer is prepared by conventional free radical initiated solution polymerization of a mixture of ethylenically unsaturated monomers comprising heterocyclic group-containing ethylenically unsaturated monomer dissolved in a second organic medium.
19. The slurry composition of Aspect 18, wherein the second organic medium used to prepare the addition polymer is the same as the organic medium of the slurry composition.
20. The slurry composition of any one of Aspects 1 to 19, further comprising a second addition polymer different from the addition polymer.
21. The slurry composition of any one of Aspects 1 to 20, wherein the slurry is substantially free of isophorone.
22. The slurry composition of any one of Aspects 1 to 21, wherein the slurry is substantially free of N-methyl-2-pyrrolidone.
23. The slurry composition of any of the preceding Aspects, wherein the electrically conductive agent comprises graphite, carbon black such as acetylene black and furnace black, graphene, carbon nanotubes, or combinations thereof.
24. The slurry composition of any one of Aspects 1 to 23, wherein the electrically conductive agent comprises conductive carbon material having a surface area of 100 m$^2$/g to 1000 m$^2$/g.
25. The slurry composition of any of the preceding Aspects, wherein the electrically conductive agent is present in the slurry composition in amounts of 1% to 20% by weight, such as 5% to 10% by weight, based on the total solids weight of the slurry.
26. The slurry composition of any of the preceding Aspects, wherein the electrochemically active material comprises a material capable of incorporating lithium.
27. The slurry composition of Aspect 26, wherein material capable of incorporating lithium comprises $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, or a combination thereof.
28. The slurry composition of any of Aspects 1 to 25, wherein the electrochemically active material comprises a material capable of lithium conversion.
29. The slurry composition of Aspect 28, wherein the material capable of lithium conversion comprises sulfur, $LiO_2$, $FeF_2$ and $FeF_3$, Si, aluminum, tin, SnCo, $Fe_3O_4$, or combinations thereof.
30. The slurry composition of any of Aspects 1 to 25, wherein the electrochemically active material comprises graphite, silicon compounds, tin, tin compounds, sulfur, sulfur compounds, or a combination thereof.
31. The slurry composition of any of the preceding Aspects, wherein the electrochemically active material is present in the slurry composition in amounts of 45% to 95% by weight, such as 70% to 98% by weight, based on the total solids weight of the slurry.
32. The slurry composition of any of the preceding Aspects, wherein the slurry composition further comprises an adhesion promoter.
33. The slurry composition of any of the preceding Aspects, wherein the slurry composition further comprises a separately added crosslinker.
34. The slurry composition of any of the preceding Aspects, wherein the binder solids are present in the slurry composition in amounts of 1% to 20% by weight, such as 1% to 10% by weight, such as 5% to 10% percent by weight, based on the total solids weight of the slurry, based on the total solids weight of the slurry.
35. The slurry composition of any of Aspects 1 to 31, wherein the binder solids are present in the slurry composition in amounts of 1% to 20% by weight, such as 1% to 10% by weight, such as 5% to 10% percent by weight, based on the total solids weight of the slurry, based on the total solids weight of the slurry, and the fluoropolymer is present in the binder in amounts of 40% to 96% by weight, such as 50% to 90% by weight; and the addition polymer is present in amounts of 2% to 20% by weight, such as 5% to 15% by weight, the % by weight being based on the total weight of the binder solids.
36. The slurry composition of Aspect 33, wherein the binder solids are present in the slurry composition in amounts of 1% to 20% by weight, such as 1% to 10% by weight, such as 5% to 10% percent by weight, based on the total solids weight of the slurry, and the fluoropolymer is present in the binder in amounts of 40% to 96% by weight, such as 50% to 90% by weight; the addition polymer is present in amounts of 2% to 20% by weight, such as 5% to 15% by weigh; and the separately added crosslinker may be present in amounts of up to 15% by weight, such as 1% to 15% by weight, the % by weight being based on the total weight of the binder solids.

37. The slurry composition of Aspect 32, wherein the binder solids are present in the slurry composition in amounts of 1% to 20% by weight, such as 1% to 10% by weight, such as 5% to 10% percent by weight, based on the total solids weight of the slurry, and the fluoropolymer is present in the binder in amounts of 40% to 96% by weight, such as 50% to 90% by weight; the addition polymer is present in amounts of 2% to 20% by weight, such as 5% to 15% by weight; and the adhesion promoter is present in the slurry composition in an amount of 10% to 60% by weight, 20% to 60% by weight, such as 30% to 60% by weight, such as 10% to 50% by weight, such as 15% to 40% by weight, such as 20% to 30% by weight, such as 35% to 35% by weight, the % by weight being based on the total weight of the binder solids.

38. The slurry composition of Aspect 33, wherein the binder solids are present in the slurry composition in amounts of 1% to 20% by weight, such as 1% to 10% by weight, such as 5% to 10% percent by weight, based on the total solids weight of the slurry, and the fluoropolymer is present in the binder in amounts of 40% to 96% by weight, such as 50% to 90% by weight; the addition polymer is present in amounts of 2% to 20% by weight, such as 5% to 15% by weight; the adhesion promoter is present in the slurry composition in an amount of 10% to 60% by weight, 20% to 60% by weight, such as 30% to 60% by weight, such as 10% to 50% by weight, such as 15% to 40% by weight, such as 20% to 30% by weight, such as 35% to 35% by weight; and the separately added crosslinker may be present in amounts of up to 15% by weight, such as 1% to 15% by weight, the % by weight being based on the total weight of the binder solids.

39. An electrode comprising:
(a) an electrical current collector; and
(b) a film formed on the electrical current collector, wherein the film is deposited from the slurry composition of any one of the preceding Aspects.

40. The electrode of Aspect 39, wherein the electrical current collector (a) comprises copper or aluminum in the form of a mesh, sheet or foil.

41. The electrode of Aspects 39 or 40, wherein the electrode comprises a positive electrode.

42. The electrode of Aspects 39 or 40, wherein the electrode comprises a negative electrode.

43. The electrode of any one of Aspects 39 to 42, wherein the film is cross-linked.

44. The electrode of any one of Aspects 39 to 43, wherein the electrical current collector is pretreated with a pretreatment composition.

45. The electrode of any one of Aspects 39 to 44, wherein the film has a thickness of at least 1 μm, such as 1 to 500 μm, such as 1 to 150 μm, such as 25 to 150 μm, such as 30 to 125 μm.

46. An electrical storage device comprising:
(a) the electrode of any one of Aspects 39 to 45;
(b) a counter electrode; and
(c) an electrolyte.

47. The electrical storage device of Aspect 46, wherein the electrolyte (c) comprises a lithium salt dissolved in a solvent.

48. The electrical storage device of Aspect 46, wherein the lithium salt is dissolved in an organic carbonate.

49. The electrical storage device of any one of Aspects 46 to 48, wherein the electrical storage device comprises a cell.

50. The electrical storage device of any one of Aspects 46 to 48, wherein the electrical storage device comprises a battery pack.

51. The electrical storage device of any one of Aspects 46 to 48, wherein the electrical storage device comprises a secondary battery.

52. The electrical storage device of any one of Aspects 46 to 48, wherein the electrical storage device comprises a capacitor.

53. The electrical storage device of any one of Aspects 46 to 48, wherein the electrical storage device comprises a supercapacitor.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

A (meth)acrylic copolymer dispersant was prepared as follows: To a four neck round bottom flask, 375.4 grams of triethylphosphate (TEP) was added and the flask was set up with a mechanical stir blade, thermocouple, and reflux condenser. The flask containing TEP solvent was heated to a set point of 120° C. under a nitrogen atmosphere. A monomer solution containing 228.2 grams of methyl methacrylate (MMA), 215.7 grams of 2-ethylhexyl acrylate (EHA), 58.4 grams of ethyl acrylate (EA), 58.4 grams of N-vinyl pyrrolidone (NVP), 11.5 grams of hydroxyethyl acrylate (HEA), and 11.5 grams of methacrylic acid (MAA) was thoroughly mixed in a separate container. A solution of 12.9 grams of tert-amylperoxy 2-ethylhexyl carbonate (Trigonox 131, available from AkzoNobel) and 61.1 grams of TEP was prepared and added into the flask over 185 minutes. Five minutes after the initiator solution started, addition of the monomer solution was started and the monomer solution was added to the flask over 180 minutes. After both initiator and monomer feeds were complete, the monomer addition funnel was rinsed with 14.4 grams of TEP. Then another solution of 4.3 grams of Trigonox 131 and 61.1 grams of TEP was added over 60 min. After this second initiator feed was complete, the initiator addition funnel was rinsed with 57.9 grams of TEP. The reaction mixture was then held at 120° C. for 60 minutes. After the 60-minute hold, the reaction mixture was cooled and poured into a suitable container. The final measured solids content of the reaction product was determined to be 51.02 weight %.

Solids contents of dispersant compositions were measured in each dispersant example by the following procedure. An aluminum weighing dish from Fisher Scientific, was weighed using an analytical balance. The weight of the empty dish was recorded to four decimal places. Approximately 0.5 g of dispersant and 3.5 g of acetone was added to the weigh dish. The weight of the dish and the dispersant solution was recorded to four decimal places. The dish containing the dispersant solution was placed into a laboratory oven, with the oven temperature set to 110 degrees centigrade, and dried for 1 hour. The weigh dish and dried dispersant was weighed using an analytical balance. The weight of the dish and dried dispersant was recorded to four decimal places. The solids was determined using the following equation: % solids=100×[(weight of the dish and the dry dispersant)−(weight of the empty dish)]/[(weight of the dish and the dispersant solution)−(weight of the empty dish)].

Example 2

A binder was prepared as follows: To a plastic cup was added triethylphosphate (41.67 grams), and the dispersant of Example 1 (26.89 grams). The mixture was stirred with a dispersing blade until the acrylic was fully incorporated into the solvent. Then, polyvinylidene fluoride polymer (PVDF T-1 from Inner Mongolia 3F Wanhao Fluorochemical Co., Ltd. 31.59 grams) was slowly added over 30 to 60 minutes while stirring with a dispersing blade until the PVDF was completely incorporated into the mixture. The measured total non-volatiles content of this slurry was 45.24 weight %.

Solids contents for all compositions other than the dispersant compositions were measured by the following procedure. An aluminum weighing dish from Fisher Scientific, was weighed using an analytical balance. The weight of the empty dish was recorded to four decimal places. Approximately Ig of dispersion was added to the weigh dish. The weight of the dish and the wet dispersion was recorded to four decimal places. The dish containing the slurry was placed into a laboratory oven, with the oven temperature set to 120 degrees centigrade, and dried for 1 hour. The weigh dish and dried dispersion was weighed using an analytical balance. The weight of the dish and dried slurry was recorded to four decimal places. The solids was determined using the following equation: % solids=100× [(weight of the dish and the dry dispersion)−(weight of the empty dish)]/ [(weight of the dish and the wet dispersion)−(weight of the empty dish)].

Example 3

An electrode slurry was prepared as follows: To a plastic cup was added triethylphosphate (14.83 grams), and the binder from Example 2 (2.15 grams). Conductive carbon LITX200 (Cabot Corp.) (0.72 grams) was added in 2 portions with each sequential blend mixed in a dual-asymmetric centrifugal mixer at 2000 rpm for 5 minutes. Cathode active powder NMC 111 (EQ-Lib-LNCM111, MTI Corp.) (22.33 grams) was added in 2 portions with each sequential blend mixed in a dual-asymmetric centrifugal mixer at 2000 rpm for 5 minutes to produce the formulated slurry. The total non-volatiles content of this slurry was 60.0 weight %. The final ratio of NMC 111:Carbon:Binder dry solids was 93:3:4.

A wet film was prepared on aluminum foil by a drawdown application of this formulated slurry using a doctor blade. This wet film was heated in an oven to a maximum temperature of 120° C. for at least 10 minutes. After cooling, an average dry film thickness of 106 microns was determined from five measurements with a micrometer. The dry film was calender-pressed to a film thickness of 87 microns. The resultant film's adhesion was tested using a 90-degree peel strength test apparatus (Mark 10, ESM303). Briefly, the coated foil was attached with double-sided tape, coating-side down, to a rigid plate, and the underlying aluminum substrate attached to a force gauge on a vertically-traversing crosshead. Tested as such, the dry film demonstrated a 90-degree peel strength of 7.9 N/m.

The viscosity profile of the slurry was measured with a 50 mm cone and plate rheometer at 25° C. The viscosity at shear rates 0.1, 1, 10, 100, and 1000 inverse seconds was 2040, 1350, 880, 599, and 427 centipoise, respectively. Unless otherwise indicated, viscosity measurements in all examples were taken at 25° C.

Example 4A

A glycidyl-functional dispersant was prepared as follows: In a four neck round bottom flask, 552.6 grams of triethylphosphate (TEP) was added and the flask was set up with a mechanical stir blade, thermocouple, and reflux condenser. The flask containing TEP solvent was heated to a set point of 120° C. under a nitrogen atmosphere. A monomer solution containing 336 grams of MMA, 285.3 grams of EHA, 134.9 grams of EA, 85.9 grams of GMA, and 17 grams of HEA was thoroughly mixed in a suitable container. A solution of 19 grams of Trigonox 131 and 89.9 grams of TEP was prepared and added into the flask over 185 minutes. Five minutes after addition of the initiator solution started, addition of the monomer solution was started and continued over 180 minutes. After both initiator and monomer feeds were complete, the monomer addition funnel was rinsed with 21.2 grams of TEP. Then another solution of 6.4 grams of Trigonox 131 and 90 grams of TEP was added over 60 min. After this second initiator feed was complete, the initiator addition funnel was rinsed with 85.2 grams of TEP. The reaction mixture was then held at 120° C. for 60 minutes. After the 60-minute hold, the reaction mixture was cooled and poured into a suitable container. The final measured solids content of the resin was determined to be 50.57 weight %.

Example 4B

The glycidyl-functional dispersant of Example 4A was post-reacted with a beta-hydroxy functional acid prepared as follows: A four neck round bottom flask was equipped with a mechanical stir blade, thermocouple, and reflux condenser. Next, 525 grams of the glycidyl-functional dispersant dispersion of Example 4A with a measured epoxy equivalent weight (EEW) of 2,826 was added to the flask followed by 31.2 grams of 3-hydroxy-2-naphthoic acid, 31.1 grams of triethylphosphate (TEP), and 0.126 grams of benzyl dimethylamine. The flask was heated to a set point of 110° C. under a nitrogen atmosphere. After holding at 110° C. for 2 hours, the reaction was heated to 140° C. The reaction temperature was maintained at 140° C. until the acid value of the resin measured less than 1. After holding at 140° C. for 6 hours, the acid value was measured to be 0.55 and the reaction was cooled down and poured into a suitable container. The final measured solids content of the resin was determined to be 50.56 weight %.

Example 5

A binder was prepared as follows: To a plastic cup was added triethylphosphate (61.05 grams), Ethyl Acetoacetate (8.25 grams), and the dispersant of Example 4 (26.70 grams). The mixture was stirred with a dispersing blade until the acrylic polymer was fully incorporated into the solvent. Then, PVDF T-1 from Inner Mongolia 3F Wanhao Fluorochemical Co., Ltd. (56.41 grams) was slowly added over 30 to 60 minutes while stirring with a dispersing blade until the PVDF was completely incorporated into the mixture. The measured total non-volatiles content of this slurry was 45.86 weight %.

Example 6

An adhesion promoter solution was prepared as follows: To a glass container was added triethylphosphate (614.25 grams), which was then heated to approximately 60° C. while stirring on a hotplate. Then, and adhesion promoter (27.00 grams, Solef 5130 available from Solvay) was slowly added over 30 to 60 minutes while stirring with a magnetic stir bar until the PVDF was completely dissolved. The measured total non-volatiles content of this slurry was 4.20 weight %.

An electrode slurry was prepared as follows: To a plastic cup was added triethylphosphate (5.93 grams), the binder from Example 5 (2.44 grams), the adhesion promoter solution described above (6.68 grams), and conductive carbon LITX200 (1.06 grams) was added in 2 portions with each sequential blend mixed in a dual-asymmetric centrifugal mixer at 1000 rpm for 5 minutes. Cathode active powder NMC 111 (32.56 grams, EQ-Lib-LNCM111, MTI Corp.) was then added in 2 portions with each sequential blend mixed in a dual-asymmetric centrifugal mixer at 1000 rpm for 5 minutes to produce the formulated slurry. The total non-volatiles content of this slurry was 70.0%. The final ratio of NMC 111:Carbon:Binder dry solids was 93:3:4.

A wet film was prepared on pre-cleaned aluminum foil by a draw-down application of this formulated slurry using a doctor blade. This wet film was heated in an oven to a maximum temperature of 90° C. for at least 20 minutes. After cooling, an average dry film thickness of 112 microns was determined from five measurements with a micrometer. The dry film was calender-pressed to a film thickness of 97 microns and demonstrated a 90-degree peel strength of 114.2 N/m, measured using the method described in Example 3.

The viscosity profile of the slurry was measured with a 50 mm cone and plate rheometer at 25° C. The viscosity at shear rates 0.1, 1, 10, 100, and 1000 inverse seconds was 214000, 52800, 19600, 9040, and 1680 centipoise, respectively.

Example 7

A (meth)acrylic copolymer dispersant was prepared as follows: In a four neck round bottom flask, 552.6 grams of triethylphosphate (TEP) was added and the flask was set up with a mechanical stir blade, thermocouple, and reflux condenser. The flask containing TEP solvent was heated to a set point of 120 C under a nitrogen atmosphere. A monomer solution containing 232 grams of MMA, 257.7 grams of EHA, 137.7 grams of EA, 214.8 grams of GMA, and 17 grams of HEA was thoroughly mixed in a suitable container. A solution of 19 grams of Trigonox 131 and 89.9 grams of TEP was prepared and added into the flask over 185 minutes. Five minutes after addition of the initiator solution started, addition of the monomer solution was started and continued over 180 minutes. After both initiator and monomer feeds were complete, the monomer addition funnel was rinsed with 21.2 grams of TEP. Then another solution of 6.4 grams of Trigonox 131 and 90 grams of TEP was added over 60 min. After this second initiator feed was complete, the initiator addition funnel was rinsed with 85.2 grams of TEP. The reaction mixture was then held at 120 C for 60 minutes. After the 60-minute hold, the reaction mixture was cooled and poured into a suitable container. The final measured solids content of the reaction product was determined to be 50.88 weight %.

Example 8

A binder was prepared as follows: To a plastic cup was added triethylphosphate (69.57 grams) and the dispersant of Example 7 (26.55 grams). The mixture was stirred with a dispersing blade until the acrylic was fully incorporated into the solvent. Then, PVDF T-1 from Inner Mongolia 3F Wanhao Fluorochemical Co., Ltd. (54.53 grams) was slowly added over 30 to 60 minutes while stirring with a dispersing blade until the PVDF was completely incorporated into the mixture. The measured total non-volatiles content was 44.36 weight %.

Example 9

An electrode slurry was prepared as follows: To a plastic cup was added triethylphosphate (16.02 grams), and the binder from Example 8 (3.69 grams). Conductive carbon LITX200 (Cabot Corp.) (1.27 grams) was added in two portions with each sequential blend mixed in a dual-asymmetric centrifugal mixer at 1000 rpm for 5 minutes. Cathode active powder NMC 111 (EQ-Lib-LNCM111, available from MTI Corp.) (39.10 grams) was added in two portions with each sequential blend mixed in a dual-asymmetric centrifugal mixer at 1000 rpm for 5 minutes to produce the formulated slurry. The total non-volatiles content of this slurry was 70.0 weight %. The final ratio of NMC111:Carbon:Binder dry solids was 93:3:4.

A wet film was prepared on aluminum foil by a draw-down application of this formulated slurry using a doctor blade. This wet film was heated in an oven to a maximum temperature of 90° C. for at least 20 minutes. After cooling, an average dry film thickness of 104 microns was determined from five measurements with a micrometer. The dry film was calender-pressed to a film thickness of 75 microns and demonstrated a 90-degree peel strength of 23.0 N/m, measured using the method described in Example 3.

Example 10

An acrylic copolymer dispersant was prepared as follows: In a four neck round bottom flask, 375.4 grams of triethylphosphate (TEP) was added and the flask was set up with a mechanical stir blade, thermocouple, and reflux condenser. The flask containing TEP solvent was heated to a set point of 120° C. under a nitrogen atmosphere. A monomer solution containing 228.2 grams of MMA, 175.3 grams of EHA, 157 grams of EA, 11.5 grams of HEA, and 11.5 grams of MAA was thoroughly mixed in a separate container. A solution of 12.9 grams of Trigonox 131 and 61.1 grams of TEP was prepared and added into the flask over 185 minutes. Five minutes after addition of the initiator solution started, addition of the monomer solution was started and continued over 180 minutes. After both initiator and monomer feeds were complete, the monomer addition funnel was rinsed with 14.4 grams of TEP. Then another solution of 4.3 grams of Trigonox 131 and 61.1 grams of TEP was added over 60 min. After this second initiator feed was complete, the initiator addition funnel was rinsed with 57.9 grams of TEP.

The reaction mixture was then held at 120° C. for 60 minutes. After the 60-minute hold, the reaction mixture was cooled and poured into a suitable container. The final measured solids of the reaction product were determined to be 50.50 weight %.

Example 11

A binder was prepared as follows: 34.75 g of the dispersant of Example 10, 24.50 g of the dispersant of Example 1, 75 g of triethylphosphate and 25 g of ethyl acetoacetate were added to a 1000 ml high density polyethylene container. The high-density polyethylene container containing the acrylic polymer and solvent components was placed into a 2 L water bath and clamped to prevent movement. The acrylic and solvent components were mixed using a 2-inch diameter Cowles mixing impeller for 5 minutes with a rotation rate of 500 RPM.

100 g PVDF T-1 from Inner Mongolia 3F Wanhao Fluorochemical Co., Ltd. was added gradually over 30 minutes to the acrylic solution while maintaining constant agitation using a 2-inch diameter Cowles mixing impeller with a rotation rate of 500 RPM.

The components were then mixed using a 2-inch diameter Cowles mixing impeller for 40 minutes at 1600 RPM. Care was taken to ensure that the slurry temperature did not rise above 40° C.

During the mixing, the water in the water bath was maintained at approximately 22-25 degrees centigrade. The water bath was used to prevent the nanoparticle dispersion from heating up during mixing. The temperature of nanoparticle dispersion was maintained below 40 degrees centigrade through-out the dispersion process.

The solids of the dispersion was confirmed to be 50% by weight.

The resultant nanoparticle dispersion was a high solids and shear thinning material that required brief agitation to achieve ease of handling during subsequent use.

Example 12

An adhesion promoter solution was prepared as follows: 636 g of triethylphosphate and 33.50 g of ethyl acetoacetate were added to a 2000 ml glass container and heated to 40 degrees centigrade using a hot plate. The warm solvent mixture was transferred to a 2000 ml high density polyethylene container. The solvent components were mixed using a 2-inch diameter Cowles mixing impeller for 5 minutes with a rotation rate of 500 RPM.

35.75 g of an adhesion promoter (Solef 5130 commercially available from Solvay) was added was added gradually over 30 minutes to the warm solvent while maintaining constant agitation using a 2-inch diameter Cowles mixing impeller with a rotation rate of 500 RPM.

The components were then mixed using a 2-inch diameter Cowles mixing impeller for 120 minutes at 1600 RPM.

The solids of the solution was confirmed to be 5% by weight.

Example 13

A solvent thinner was prepared as follows: 800 g of triethylphosphate and 200 g of ethyl acetoacetate were added to a 1000 ml high density polyethylene container. The container was capped, and then solvents were mixed together by shaking for 30 seconds.

Example 14

An anode slurry was prepared as follows: Slurry components were mixed in a polypropylene cup held in a PTFE adaptor using a dual asymmetric centrifugal mixer Model ARM-310, made by Thinky Corporation, Japan.

Before preparing the slurry, the individual binder components from examples 11 and 12 were agitated by shaking for 30 seconds, until low enough in viscosity to dispense.

2.11 g nanoparticle dispersion binder of example 11 and then 33.97 g Thinner of example 13 were added to a 250 ml polypropylene mixing cup. The components were then mixed using a dual asymmetric centrifugal mixer for 1 minute at 2000 RPM. The diluted binder was clear and low viscosity.

0.84 g Timcal Super P carbon black from Imerys Graphite & Carbon Belgium SA was added to the diluted binder solution. The components were then mixed using a dual asymmetric centrifugal mixer for 5 minutes at 500 RPM followed by 2 minutes at 2000 RPM. Care was taken to ensure that the slurry temperature did not rise above 40° C. After mixing, the carbon black in binder solution was held without mixing for 30 minutes before proceeding further.

After the 30-minute hold period above, the carbon black in binder solution was mixed using a dual asymmetric centrifugal mixer for 5 minutes at 500 RPM.

22.22 g AML400 graphite from Dongguan Kaijin New Energy Technology Co., Ltd was added to the carbon black and binder mix. The components were then mixed using a dual asymmetric centrifugal mixer for 2 minutes at 1000 RPM followed by 4 minutes at 2000 RPM. Care was taken to ensure that the slurry temperature did not rise above 40° C.

A further 11.11 g AML400 graphite was added to the graphite, carbon black and binder mix. The components were then mixed using a dual asymmetric centrifugal mixer for 2 minutes at 1000 RPM followed by 4 minutes at 2000 RPM. Care was taken to ensure that the slurry temperature did not rise above 40° C.

A further 11.11 g AML400 graphite was added to the graphite, carbon black and binder mix. The components were then mixed using a dual asymmetric centrifugal mixer for 2 minutes at 1000 RPM followed by 4 minutes at 2000 RPM. The components were then mixed using a dual asymmetric centrifugal mixer for 2 minutes at 1000 RPM followed by 2 minutes at 2000 RPM. The components were then mixed using a dual asymmetric centrifugal mixer for 2 minutes at 1000 RPM followed by 2 minutes at 2000 RPM. Care was taken to ensure that the slurry temperature did not rise above 40° C.

6.73 g of the adhesion promoter solution of Example 12 was added to the graphite, carbon black and binder mix. The components were then mixed using a dual asymmetric centrifugal mixer for 2 minutes at 1000 RPM. The components were then mixed using a dual asymmetric centrifugal mixer for 28 minutes at 2000 RPM, in 2-minute increments. Care was taken to ensure that the slurry temperature did not rise above 40° C.

The solids of the resultant slurry was confirmed to be 53% by weight.

The viscosity of the resultant slurry was measured at room temperature using a Brookfield viscometer model LVDV-I+, using spindle number 3 from an LV spindle set with rotation rates of 2, 4, 10, and 20 RPM. The measured Brookfield viscosities are shown in table 1.

TABLE 1

| | Viscosity (cP) | | | |
|---|---|---|---|---|
| % Solids | 2 RPM | 4 RPM | 10 RPM | 20 RPM |
| 53 | 15120 | 10350 | 6820 | 5100 |

Example 15

An electrode was prepared as follows: A 6 cm by 30 cm sample of 10-micron thick copper foil was placed onto an AFA-II automatic thick film coater from MTI Corporation, wiped with acetone and then wiped with isopropanol. To the cleaned aluminum foil, an aliquot of the anode slurry of Example 14 was applied as a wet coating using a 10 cm wide doctor blade with a blade gap setting of approximately 135 microns.

Foils coated with wet anode coatings were dried using a Despatch brand Class A laboratory box oven with a 2.5" diameter exhaust duct and a Protocol 3 programmable controller using the following ramp-and-soak conditions: Initial set point of 55 degrees centigrade; place the coated foil into the oven; hold at 55 degrees centigrade for 3 minutes; ramp from 55 degrees centigrade to 70 degrees centigrade over 1 minute; hold at 70 degrees centigrade for 2 minutes; ramp from 70 degrees centigrade to 90 degrees centigrade over 4 minutes; remove the coated foil from the oven.

The dry film thickness (DFT) of the anode coating on the foil was measured using a digital micrometer, taking an average of six measurements, and subtracting the thickness of uncoated foil to calculate the thickness of the anode coating only. The measured DFT is shown in table 2.

A nine square centimeter area of coated foil was weighed using an analytical balance. The weight of the foil and dried slurry coating was recorded to four decimals. A nine square centimeter area of uncoated foil was also weighed using an analytical balance. The weight of the uncoated foil was recorded to four decimals. The weight of the dried coating was calculated by subtracting the weight of the uncoated foil from the weight of the coated foil.

The measured volume of the coating was determined by multiplying the area of the coated foil (nine square centimeters) by the average measured thickness of the coating. The porosity of the dried coated foil was calculated based on the measured volume of the anode coating, the measured mass of the anode coating, the composition of the anode and the known densities of the cathode components. The calculated porosity of the anode coating as coated is shown in table 2.

The dried coated foils were then pressed using an IMC calender press with 8-inch diameter rolls and a line speed of 0.2 meters per minute to a target porosity of 35%. The pressed film thickness (PFT) of the cathode coating calendared to 35% porosity, measured using a digital micrometer, is shown in table 3.

The flexibility of the calender pressed films was verified using a pentagon mandrel bend test apparatus and using the test method detailed in FTMS No. 141, Method 6221, Flexibility with a ⅛-inch radius mandrel. If failure is observed, using a ⅛-inch radius mandrel, an untested area is tested using a larger radius mandrel until no failure is observed, and the radius at which a pass is first observed is noted. The pentagon mandrel bend test apparatus has test radii of ⅛, ¼, ⅜, ½, ⅝, ¾ and 1 inch.

The peel strength of the calender pressed films were determined using the following procedure: Firstly, samples of the pressed anode coated foil were mounted. Four approximately 100 mm long pieces of 12.7 mm wide 3M™ Double Coated Tape 444 were each adhered to four separate steel panels using one side of the double coated tape. Four strips approximately 14-15 mm wide and approximately 140-160 mm in length were cut from the pressed anode coated foils. Each of the four strips was then adhered to the other side of the double coated tape on the steel panels, such that the anode coated side of the foil was contacting the adhesive tape and also such that about 40-60 mm of the pressed anode coated foil remained free and un-adhered. One ¼ inch size binder clip was clipped to the free and un-adhered end of the pressed anode coated foil. Secondly, the first mounted foil was placed, onto the sample stage of a ESM303 Motorized Tension/Compression Test Stand fitted with a Series 5 advanced digital force gauge, model M5-5, a model DC4060 digital control panel, and a model G1045 90-degree peel fixture. The mounted foil was held in place magnetically, and the binder clip was attached to the sampling fixture of the force gauge. Thirdly, the peel strength of the pressed anode coating was measured for an average of 600 measurements with a sample rate of 0.2 s and a peel rate of 50 mm per minute. The peel strength data was collected using MESUR™ gauge software on a pc. These mounting and measuring steps were repeated for the remaining three strips. The data from the four strips were analyzed to determine an average peel strength and a standard deviation for peel strength in N/m which are shown in table 3. The failure mode of the peeled foil was also assessed visually and noted as being "adhesive/clean", or "adhesive/dirty", or "cohesive", or "mixed", such that "adhesive/clean" was an adhesive failure of the coating from the foil leaving mostly clean foil, "adhesive/dirty" was also a primarily adhesive failure of the coating from the foil leaving foil with some slight observable covering of coating, "cohesive" failure was a splitting of the coating within the bulk of the coating layer, and "mixed", was some combination of the above varying over the measured sample area.

TABLE 2

| DFT (μm) | % porosity as coated | Defects | ⅛ in (3 mm) mandrel Bend |
|---|---|---|---|
| 72 | 56 | None | Pass |

TABLE 3

| PFT (μm) | Peel strength (N/m) |
|---|---|
| 48 | 4.8 ± 0.8 |

Example 16

A cathode slurry was prepared as follows: Slurry components were mixed in a polypropylene cup held in a PTFE adaptor using a dual asymmetric centrifugal mixer Model ARM-310, made by Thinky Corporation, Japan.

Before preparing the slurry, the individual binder components from Examples 11 and 12 were agitated by shaking for 30 seconds, until low enough in viscosity to dispense.

4.524 g nanoparticle dispersion binder of Example 11 and then 42.24 g Thinner of Example 13 were added to a 250 ml polypropylene mixing cup. The components were then mixed using a dual asymmetric centrifugal mixer for 1 minute at 2000 RPM. The diluted binder was clear and low viscosity.

2.81 g Timcal Super P carbon black from Imerys Graphite & Carbon Belgium SA was added to the diluted binder solution. The components were then mixed using a dual asymmetric centrifugal mixer for 5 minutes at 1000 RPM. Care was taken to ensure that the slurry temperature did not rise above 40° C. After mixing, the carbon black in binder solution was held without mixing for 5 minutes before proceeding further.

After the above 5-minute hold period, 15 g Phostech P2 Lithium Iron Phosphate (LFP) from Johnson Matthey was added to the carbon black and binder mix. The components were then mixed using a dual asymmetric centrifugal mixer for 5 minutes at 500 RPM followed by 5 minutes at 1500 RPM. Care was taken to ensure that the slurry temperature did not rise above 40° C.

A further 15 g Phostech P2 LFP was added to the LFP, carbon black and binder mix. The components were then mixed using a dual asymmetric centrifugal mixer for 5 minutes at 500 RPM followed by 5 minutes at 1500 RPM. Care was taken to ensure that the slurry temperature did not rise above 40° C.

A further 11.28 g Phostech P2 LFP was added to the LFP, carbon black and binder mix. The components were then mixed using a dual asymmetric centrifugal mixer for 5 minutes at 500 RPM followed by 5 minutes at 1000 RPM. Care was taken to ensure that the slurry temperature did not rise above 40° C. After mixing, the slurry was held without mixing for 10 minutes before proceeding further.

11.165 g of the adhesion promoter solution of Example 12 was added to the LFP, carbon black and binder mix. The components were then mixed using a dual asymmetric centrifugal mixer for 5 minutes at 1000 RPM. The slurry was held without mixing for 5 minutes before proceeding further. The components were then mixed using a dual asymmetric centrifugal mixer for 20 minutes at 500 RPM. Care was taken to ensure that the slurry temperature did not rise above 40° C. After mixing, the slurry was held without mixing for 10 minutes before proceeding further.

The components were then mixed using a dual asymmetric centrifugal mixer for 20 minutes at 500 RPM followed by 5 minutes at 1000 RPM. Care was taken to ensure that the slurry temperature did not rise above 40° C.

The solids of the resultant slurry was confirmed to be 46 weight %.

The viscosity of the resultant slurry was measured using a Brookfield viscometer model LVDV-I+, using spindle number 3 from an LV spindle set with a rotation rate of 20 RPM. The viscosity was measured immediately following mixing (day 1), two days later (day 3), nine days later (day 10) and thirteen days later (Day 14). The measured Brookfield viscosities are shown in table 4.

Example 17

An electrode was prepared as follows: A 6 cm by 30 cm sample of 15-micron thick aluminum foil was placed onto an AFA-II automatic thick film coater from MTI Corporation, wiped with acetone and then wiped with isopropanol. To the cleaned aluminum foil, an aliquot of the cathode slurry of Example 16 was applied as a wet coating using a 10 cm wide doctor blade with a blade gap setting of approximately 125 microns.

Foils coated with wet cathode coatings were dried using a Despatch brand Class A laboratory box oven with a 2.5" diameter exhaust duct and a Protocol 3 programmable controller using the following ramp-and-soak conditions: Initial set point of 55 degrees centigrade; place the coated foil into the oven; hold at 55 degrees centigrade for 3 minutes; ramp from 55 degrees centigrade to 70 degrees centigrade over 1 minute; hold at 70 degrees centigrade for 2 minutes; ramp from 70 degrees centigrade to 90 degrees centigrade over 4 minutes; remove the coated foil from the oven.

The dry film thickness (DFT) of the cathode coating on the foil was measured using a digital micrometer, taking an average of six measurements, and subtracting the thickness of uncoated foil to calculate the thickness of the cathode coating only. The measured DFT is shown in table 5.

A nine square centimeter area of coated foil was weighed using an analytical balance. The weight of the foil and dried slurry coating was recorded to four decimals. A nine square centimeter area of uncoated foil was also weighed using an analytical balance. The weight of the uncoated foil was recorded to four decimals. The weight of the dried coating was calculated by subtracting the weight of the uncoated foil from the weight of the coated foil.

The measured volume of the coating was determined by multiplying the area of the coated foil (nine square centimeters) by the average measured thickness of the coating. The porosity of the dried coated foil was calculated based on the measured volume of the cathode coating, the measured mass of the cathode coating, the composition of the cathode and the known densities of the cathode components. The calculated porosity of the cathode coating as coated is shown in table 5.

The dried coated foils were then pressed using an IMC calender press with 8-inch diameter rolls and a line speed of 0.2 meters per minute to a target porosity of 35%. The pressed film thickness (PFT) of the cathode coating calendared to 35% porosity, measured using a digital micrometer, is shown in table 6.

The flexibility of the calender pressed films was verified as in Example 15.

The peel strength of the calender pressed films were determined as in Example 15. The data from the four strips were analyzed to determine an average peel strength and a standard deviation for peel strength in N/m which are shown in table 6. The failure mode of the peeled foil was also assessed visually and noted as being "adhesive/clean", or "adhesive/dirty", or "cohesive", or "mixed", such that "adhesive/clean".

Example 18 (Comparative)

A conventional PVDF binder solution in N-methyl-2-pyrrolidone (NMP) was prepared as follows: 1141.44 g of n-methyl pyrrolidone was added to a 1-gallon metal can. The solvent was mixed using a 3-inch diameter Cowles mixing impeller with a rotation rate of 500 RPM. 58.56 g PVDF T-1 from Inner Mongolia 3F Wanhao Fluorochemical Co., Ltd. was added gradually over 30 minutes to the solvent while maintaining constant agitation using a 3-inch diameter Cowles mixing impeller with a rotation rate of 500 RPM.

The solids of the solution was confirmed to be 4.9% by weight.

Example 19 (Comparative)

A conventional electrode slurry was prepared as follows: Slurry components were mixed in a polypropylene cup held in a PTFE adaptor using a dual asymmetric centrifugal mixer Model ARM-310, made by Thinky Corporation, Japan.

Before preparing the slurry, the binder components from Comparative example 18 was agitated by shaking for 30 seconds.

24.05 g PDVF binder solution in NMP of Comparative example 18 and then 13.32 g of NMP were added to a 250 ml polypropylene mixing cup. The components were then mixed using a dual asymmetric centrifugal mixer for 1 minute at 2000 RPM. The diluted binder was clear and low viscosity.

0.585 g Timcal Super P carbon black from Imerys Graphite & Carbon Belgium SA was added to the diluted binder solution. The components were then mixed using a dual asymmetric centrifugal mixer for 5 minutes at 1000 RPM.

A further 0.585 g Timcal Super P carbon black from Imerys Graphite & Carbon Belgium SA was added to the above binder and carbon mixture. The components were then mixed using a dual asymmetric centrifugal mixer for 5 minutes at 2000 RPM. After mixing, the carbon black in binder solution was held without mixing for 5 minutes before proceeding further.

After the above 5-minute hold period, 8.575 g Phostech P2 Lithium Iron Phosphate (LFP) from Johnson Matthey was added to the carbon black and binder mix. The components were then mixed using a dual asymmetric centrifugal mixer for 5 minutes at 500 RPM followed by 5 minutes at 1500 RPM.

A further 8.575 g Phostech P2 LFP was added to the LFP, carbon black and binder mix. The components were then mixed using a dual asymmetric centrifugal mixer for 5 minutes at 500 RPM followed by 5 minutes at 2000 RPM. After mixing, the LFP, carbon black and binder mix was held without mixing for 5 minutes before proceeding further.

The components were then mixed using a dual asymmetric centrifugal mixer for 5 minutes at 2000 RPM. After mixing, the LFP, carbon black and binder mix was held without mixing for 5 minutes before proceeding further.

The components were then mixed using a dual asymmetric centrifugal mixer for 5 minutes at 2000 RPM. After mixing, the LFP, carbon black and binder mix was held without mixing for 5 minutes before proceeding further.

The components were then mixed using a dual asymmetric centrifugal mixer for 5 minutes at 2000 RPM.

The solids of the resultant slurry was confirmed to be 35 weight %.

The viscosity of the resultant slurry was measured using a Brookfield viscometer model LVDV-I+, using spindle number 3 from an LV spindle set with a rotation rate of 20 RPM. The viscosity was measured immediately following mixing (day 1), two days later (day 3), nine days later (day 10) and thirteen days later (Day 14). The measured Brookfield viscosities are shown in table 4.

TABLE 4

| Example | Binder | % Solids | Viscosity (cP) | | | |
| --- | --- | --- | --- | --- | --- | --- |
| | | | Day 1 | Day 3 | Day 10 | Day 14 |
| Example 16 | Invention | 46.0 | 4830 | 3690 | 3480 | 3360 |
| Example 19 | PVDF NMP | 35.0 | 5730 | | Gelled | |

The binder system of the current invention (Example 16) appears advantaged compared to PVDF in NMP (Example 19) for managing viscosity within the range necessary for typical roll-to-roll electrode application utilized in industrial lithium ion battery production, at higher application solids for both power cell and energy cell compositions. This advantage is more notable with high carbon content power cells.

The binder system of the current invention (Example 16) enables shelf stable slurries compared with PVDF/NMP comparative (Example 19) which form unrecoverable gels within 36-48 hrs of slurry preparation. Following gentle agitation, the slurry viscosities remain within a range necessary for typical roll-to-roll electrode application utilized in industrial lithium ion battery production and the out-of-cell performance is maintained.

Example 20 (Comparative)

A 6 cm by 30 cm sample of 15-micron thick aluminum foil was placed onto an AFA-II automatic thick film coater from MTI Corporation, wiped with acetone and then wiped with isopropanol. To the cleaned aluminum foil, an aliquot of the cathode slurry of Comparative Example 19 was applied as a wet coating using a 10 cm wide doctor blade with a blade gap setting of approximately 145 microns.

Foils coated with wet cathode coatings were dried using a Despatch brand Class A laboratory box oven with a 2.5" diameter exhaust duct and a Protocol 3 programmable controller using the following ramp-and-soak conditions: Initial set point of 55 degrees centigrade; place the coated foil into the oven; hold at 55 degrees centigrade for 3 minutes; ramp from 55 degrees centigrade to 70 degrees centigrade over 1 minute; hold at 70 degrees centigrade for 2 minutes; ramp from 70 degrees centigrade to 90 degrees centigrade over 4 minutes; remove the coated foil from the oven.

The dry film thickness (DFT) of the cathode coating on the foil was measured using a digital micrometer, taking an average of six measurements, and subtracting the thickness of uncoated foil to calculate the thickness of the cathode coating only. The measured DFT was 41 microns, as shown in Table 5.

A nine square centimeter area of coated foil was weighed using an analytical balance. The weight of the foil and dried slurry coating was recorded to four decimals. A nine square centimeter area of uncoated foil was also weighed using an analytical balance. The weight of the uncoated foil was recorded to four decimals. The weight of the dried coating was calculated by subtracting the weight of the uncoated foil from the weight of the coated foil.

The measured volume of the coating was determined by multiplying the area of the coated foil (nine square centimeters) by the average measured thickness of the coating. The porosity of the dried coated foil was calculated based on the measured volume of the cathode coating, the measured mass of the cathode coating, the composition of the cathode and the known densities of the cathode components. The calculated initial porosity of the cathode coating as coated was 60%, as shown in Table 5.

The dried coated foils were then pressed using an IMC calender press with 8-inch diameter rolls, heated to 80 degrees C., with a calendaring pressure of 3000 psi and a line speed of 0.2 meters per minute to a target porosity of 35%. The pressed film thickness (PFT) of the cathode coating calendared to 35% porosity, measured using a digital micrometer, was 25 microns, as shown in Table 6.

The flexibility of the calender pressed films was verified as in Example 15.

The peel strength of the calender pressed films were determined as in Example 15. The data from the four strips were analyzed to determine an average peel strength and a standard deviation for peel strength in N/m which are shown in table 6.

TABLE 5

| Example | Binder | DFT (μm) | % porosity as coated | Defects | 3 mm mandrel Bend |
|---|---|---|---|---|---|
| Example 17 | Invention | 43 | 54 | none | Pass |
| Example 20 | PVDF NMP | 41 | 60 | none | Pass |

The coated and dried film properties of electrodes produced with the binder system of the current invention (Example 17) appear advantaged compared to electrodes produced with PVDF in NMP (Example 20): The binder system of the current invention enables flexible electrodes for high-capacity energy cells, while maintaining initial porosities that are comparable to PVDF/NMP comparative. The binder system of the current invention enables improved initial porosities for high carbon content power cell compared to PVDF/NMP comparative, while maintaining flexibility.

TABLE 6

| Example | Composition | Active | Carbon | Binder | PFT (μm) | Peel strength (N/m) | Failure mode |
|---|---|---|---|---|---|---|---|
| Example 17 | 88-6-6 | LFP | Super P | Invention | 31 | 42.4 ± 3.8 | Mixed* |
| Example 20 | 88-6-6 | LFP | Super P | PVDF NMP | 25 | 16.6 ± 1.7 | Mixed*‡ |

*some cohesive failure (>200 N/m) only adhesive failure region peel strength recorded
*‡some cohesive failure (>100 N/m) only adhesive failure region peel strength recorded All coated electrodes calendar pressed without film defects or damage. Peel strength measurements with 88-6-6 power cell compositions were conducted after a cut was made through the coating to the substrate; otherwise the tape would fail adhesively at the surface of the pressed cathode coating. Peel strength with binder formulations according to the present invention exceeds NMP comparative and industry minima and are sufficient for cylindrical and prismatic cells.

Example 21

A (meth)acrylic copolymer dispersant was prepared as follows: In a four neck round bottom flask, 375.4 grams of triethylphosphate (TEP) was added and the flask was set up with a mechanical stir blade, thermocouple, and reflux condenser. The flask containing TEP solvent was heated to a set point of 120 C under a nitrogen atmosphere. A monomer solution containing 227.6 grams of MMA, 148.2 grams of EHA, 126 grams of BA, 58.4 grams of acetoacetoxyethyl methacrylate (AAEM), 11.5 grams of HEA, and 11.5 grams of MAA was thoroughly mixed in a separate container. A solution of 12.9 grams of Trigonox 131 and 61.1 grams of TEP was prepared and added into the flask over 185 minutes. Five minutes after the initiator solution started, the monomer solution was started and added over 180 minutes. After both initiator and monomer feeds were complete, the monomer addition funnel was rinsed with 14.4 grams of TEP. Then another solution of 4.3 grams of Trigonox 131 and 61.1 grams of TEP was added over 60 min. After this second initiator feed was complete, the initiator addition funnel was rinsed with 57.9 grams of TEP. The reaction was then held at 120 C for 60 minutes. After the 60-minute hold, the reaction was cooled and poured into a suitable container. The final measured solids content of the resin was determined to be 48.82 weight %.

Example 22

A binder was prepared as follows: To a plastic cup was added triethylphosphate (68.368 grams), and the dispersant of Example 21 (27.685 grams). The mixture was stirred with a dispersing blade until the acrylic was fully incorporated into the solvent. Then, PVDF T-1 from Inner Mongolia 3F Wanhao Fluorochemical Co., Ltd. (54.300 grams) was slowly added over 30 to 60 minutes while stirring with a dispersing blade until the PVDF was completely incorporated into the mixture. The measured total non-volatiles content of this slurry was 45.14 weight %.

Example 23

An electrode slurry was prepared as follows: To a plastic cup was added triethylphosphate (15.936 grams), and the binder from Example 22 (3.763 grams). Conductive carbon LITX200 (Cabot Corp.) (1.277 grams) was added in 2 portions with each sequential blend mixed in a dual-asymmetric centrifugal mixer at 1000 rpm for 5 minutes. Cathode active powder NMC 111 (EQ-Lib-LNCM111, MTI Corp.) (39.07 grams) was added in 2 portions with each sequential blend mixed in a dual-asymmetric centrifugal mixer at 1000 rpm for 5 minutes to produce the formulated slurry. The total non-volatiles content of this slurry was 70.0 weight %. The final ratio of NMC 111:Carbon:Binder dry solids was 93:3:4.

A wet film was prepared on pre-cleaned aluminum foil by a draw-down application of this formulated slurry using a doctor blade. This wet film was heated in an oven to a maximum temperature of 90° C. for at least 10 minutes. After cooling, an average dry film thickness of 51 microns was determined from five measurements with a micrometer. The dry film was calender-pressed to a film thickness of 37 microns and demonstrated a 90-degree peel strength of 62.15 N/m, measured as in Example 15.

The viscosity profile of the slurry was measured with a 50 mm cone and plate rheometer at 25° C. The viscosity at shear rates 0.1, 1, 10, 100, and 1000 inverse seconds was 2930, 1320, 743, 498, and 354 centipoise, respectively.

Example 24

The addition polymers were evaluated for their ability to disperse carbon: To a glass vial was added about 34.4 g TEP and about 0.25 g of the addition polymer. The mixture was sonicated or shaken to dissolve. The exact amount of addition polymer and triethyl phosphate was adjusted such that the addition polymer was 0.402% by mass of the solution and such that the total mass of the solution was 34.764 grams. Then, 1.600 grams of carbon black (Timcal Super P, available from Imerys SA, Belgium) was added to the vial such that the carbon was 4.400% mass of the solution. The mixture was sonicated or shaken vigorously to mix the carbon dispersion. The viscosity of such mixtures was measured using an Anton-Paar MCR302 rheometer using a CC27 conical cylinder and cup tool (serial number 38116), where the cup and cylinder had a diameter of 28.914 mm and 26.652 mm, respectively. All the viscosity measurements were carried out at 25° C., and the viscosity was measured at a shear rate of 39.8 inverse seconds. The addition polymer comprising a heterocyclic group of Example 1 and the addition polymer comprising a heterocyclic group postreacted with an acid of Example 4B were compared to an addition polymer that does not comprise a heterocyclic group as prepared in Example 10. The results are provided in Table 7 below.

TABLE 7

| Heterocyclic functionality | Example | Viscosity at 39.8 s$^{-1}$ (cP) | Relative viscosity |
|---|---|---|---|
| None | Example 10 | 135 | 100% |
| Glydicyl post-reacted with acid | Example 4B | 80 | 59% |
| Pyrrolidone | Example 1 | 54 | 40% |

The results in Table 7 indicate that the addition polymers that include heterocyclic functionality better disperse carbon than addition polymer that do not as demonstrated by the reduced viscosity of carbon dispersions that include the addition polymers from Examples 1 and 4B as compared to the addition polymer of Example 10.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. A binder composition for use in an electrode slurry composition, wherein the binder composition comprises:
   (i) a polymer comprising a fluoropolymer dispersed in an organic medium comprising at least 90% by weight of an organic solvent, based on the total weight of the organic medium; and
   (ii) a dispersant comprising an addition polymer comprising constitutional units comprising the residue of a heterocyclic group-containing ethylenically unsaturated monomer comprising vinyl pyrrolidone.

2. The binder composition of claim 1, wherein the addition polymer further comprises constitutional units comprising the residue of methyl (meth)acrylate.

3. The binder composition of claim 2, wherein the addition polymer comprises constitutional units comprising 1% to 99% by weight of the residue of vinyl pyrrolidone and 1% to 99% by weight of the residue of methyl (meth)acrylate, the % by weight based on the total weight of the addition polymer.

4. The binder composition of claim 1, wherein the binder composition further comprises a second addition polymer comprising the residue of a heterocyclic group-containing ethylenically unsaturated monomer comprising an epoxy functional ethylenically unsaturated monomer.

5. The binder composition of claim 1, wherein the binder composition further comprises a second addition polymer comprising the residue of a heterocyclic group-containing ethylenically unsaturated monomer comprising an epoxy functional ethylenically unsaturated monomer and a compound having a functional group reactive with the epoxy functional group is grafted onto the second addition polymer by reaction with the epoxy functional group.

6. The binder composition of claim 1, wherein the liquid medium comprises an organic medium having an evaporation rate of less than 10 g/min m$^2$, at the dissolution temperature of the fluoropolymer dispersed in the organic medium.

7. The binder composition of claim 1, wherein the organic medium has an evaporation rate greater than 80 g/min m$^2$, at 180° C.

8. The binder composition of claim 1, wherein the organic medium comprises butyl pyrrolidate, trialkylphosphate, 1,2,3-triacetoxypropane, 3-methoxy-N,N-dimethylpropanamide, ethyl acetoacetate, gamma-butyrolactone, propylene glycol methyl ether, or combinations thereof.

9. The binder composition of claim 1, wherein the organic medium comprises a primary solvent comprising trialkylphosphate and a co-solvent.

10. The binder composition of claim 1, wherein the organic medium comprises a primary solvent comprising triethyl phosphate and a co-solvent comprising ethyl acetoacetate.

11. The binder composition of claim 1, further comprising a third addition polymer, wherein the third addition polymer is free of heterocyclic groups.

12. The binder composition of claim 1, wherein the composition is substantially free of isophorone.

13. The binder composition of claim 1, wherein the composition is substantially free of N-methyl-2-pyrrolidone.

14. A slurry composition comprising:
   (a) an electrochemically active material and/or an electrically conductive agent; and
   (b) the binder composition of claim 1.

15. The slurry composition of claim 14, wherein the electrically conductive agent is present and comprises graphite, acetylene black, furnace black, graphene, carbon nanotubes, or combinations thereof.

16. The slurry composition of claim 14, wherein the electrically conductive agent is present and comprises carbon nanotubes.

17. The slurry composition of claim 14, wherein the electrically conductive agent is present and comprises conductive carbon material having a surface area of 100 m$^2$/g to 1,000 m$^2$/g.

18. A slurry composition comprising:
   (a) carbon nanotubes; and
   (b) the binder composition of claim 1.

19. An electrode comprising:
   (a) an electrical current collector; and
   (b) a film formed on the electrical current collector, wherein the film is deposited from the slurry composition of claim 14.

20. An electrical storage device comprising:
   (a) the electrode of claim 19;
   (b) a counter electrode; and
   (c) an electrolyte.

* * * * *